Feb. 23, 1932.  A. T. KOPPE  1,847,010
PRECISION CAMERA
Filed Oct. 19, 1926   14 Sheets-Sheet 1
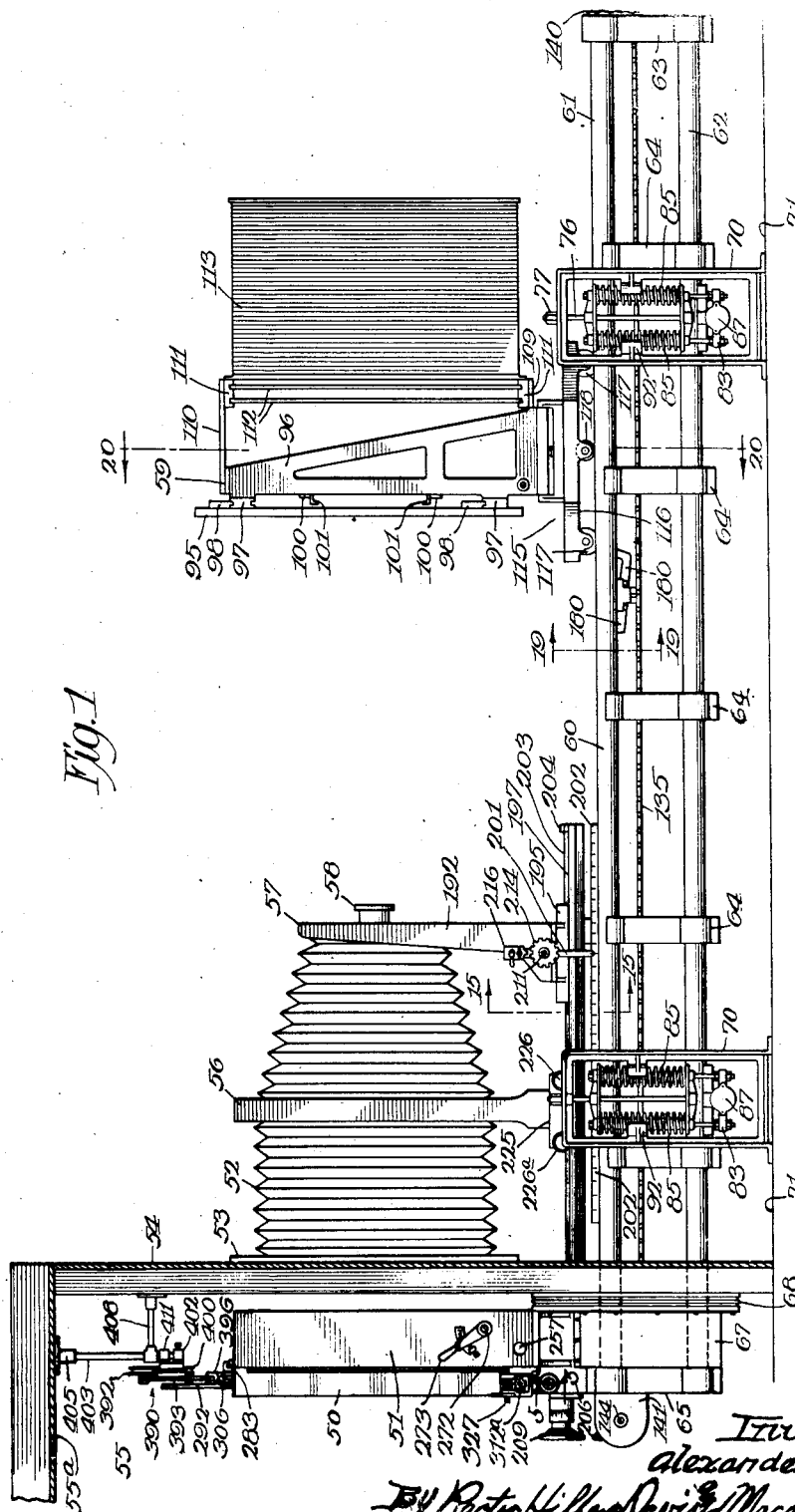
Fig.1

Feb. 23, 1932.    A. T. KOPPE    1,847,010
PRECISION CAMERA
Filed Oct. 19, 1926    14 Sheets-Sheet 2
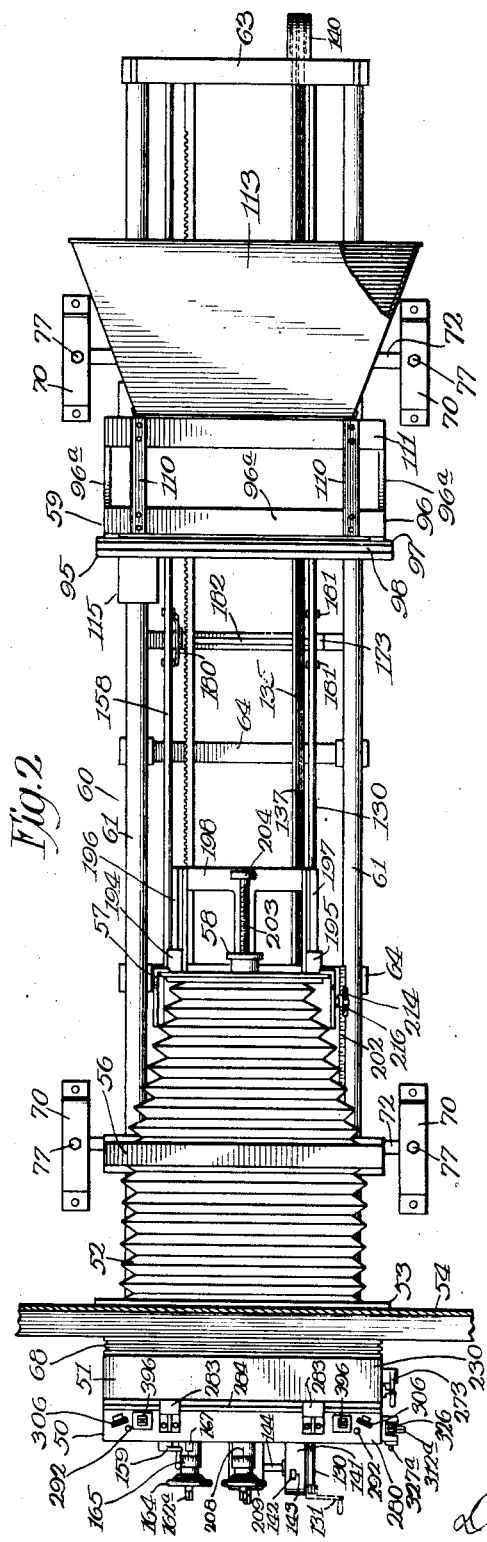
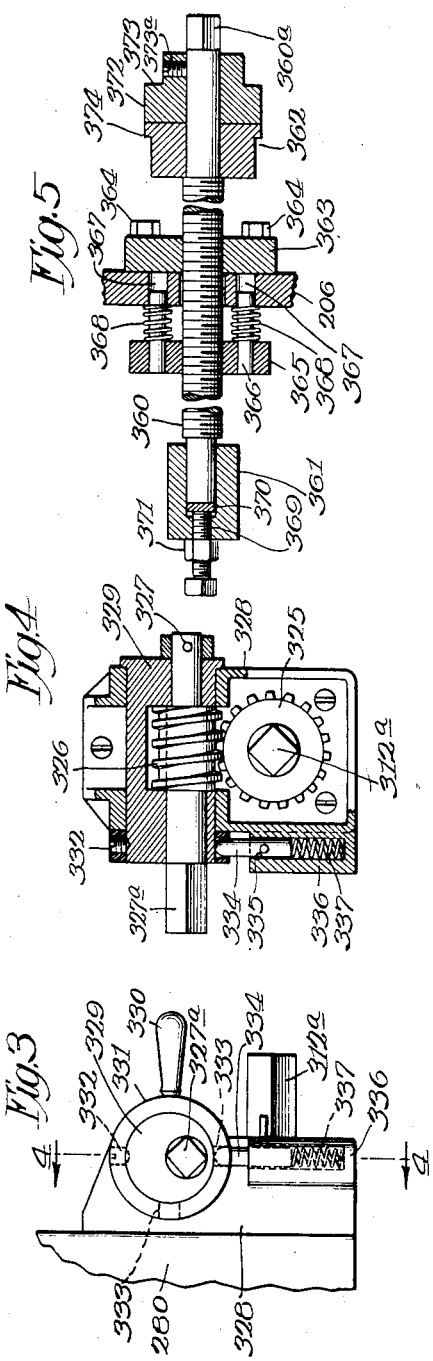
Inventor.
Alexander T. Koppe
By Rector, Hibben,
Davis and Macauley, Attys

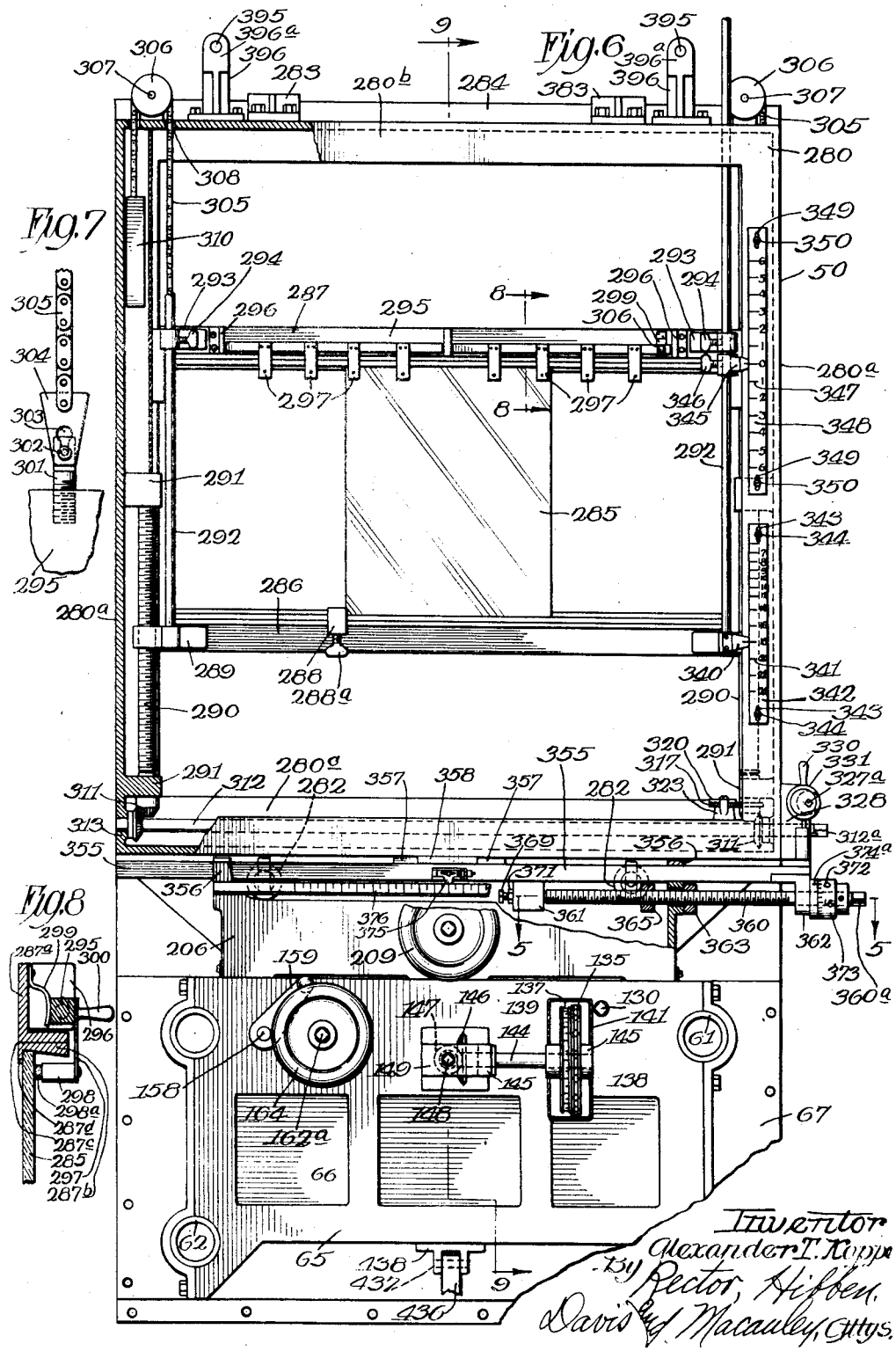

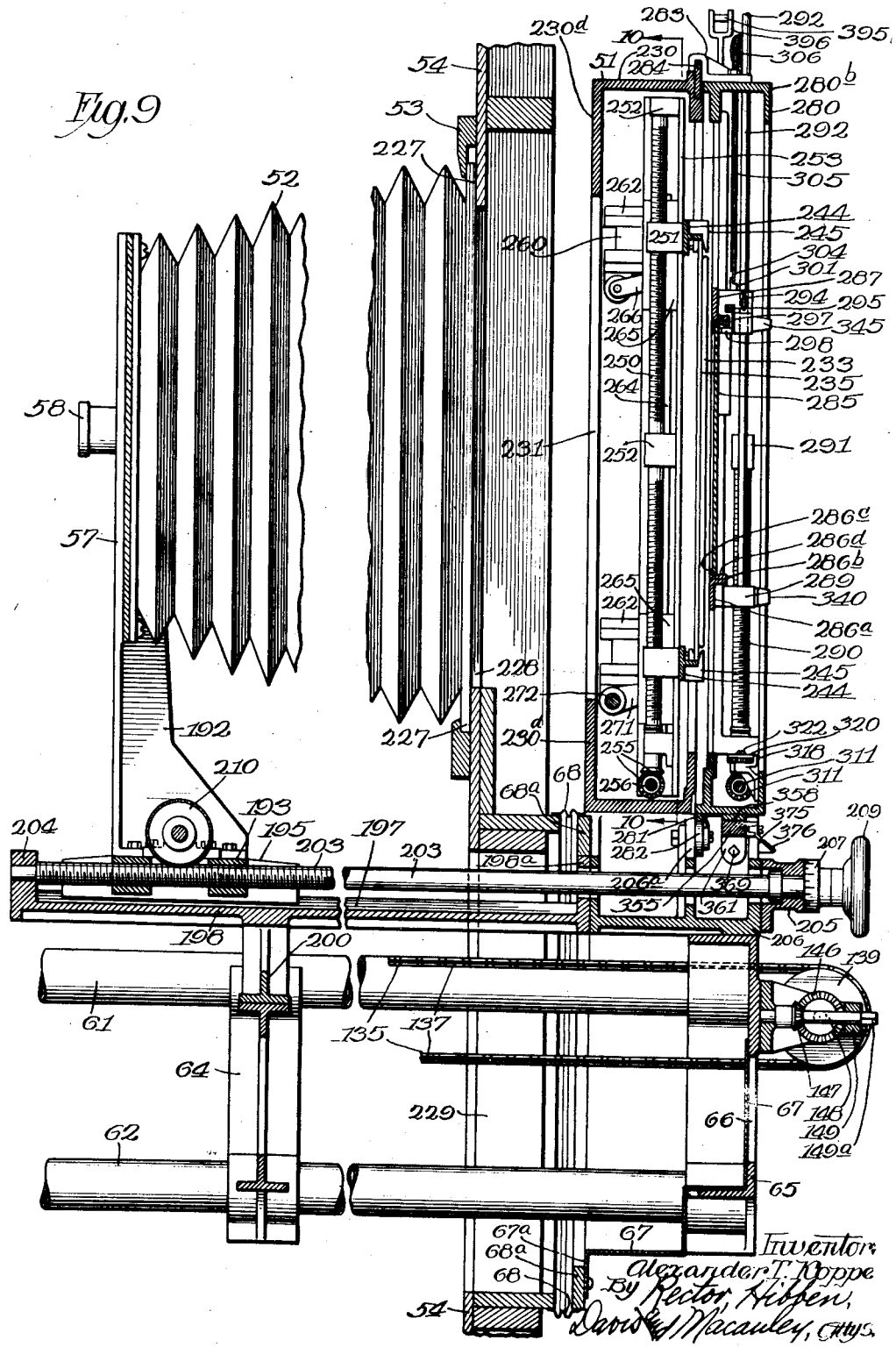

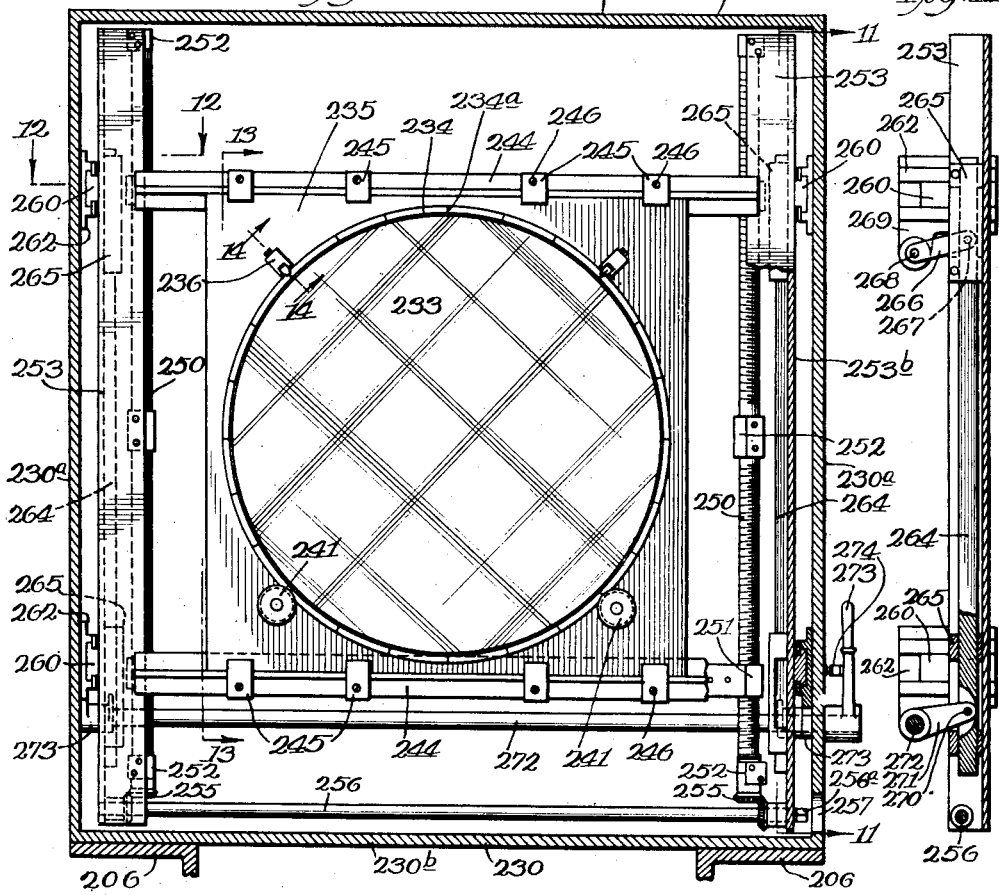

Feb. 23, 1932. A. T. KOPPE 1,847,010
PRECISION CAMERA
Filed Oct. 19, 1926  14 Sheets-Sheet 6
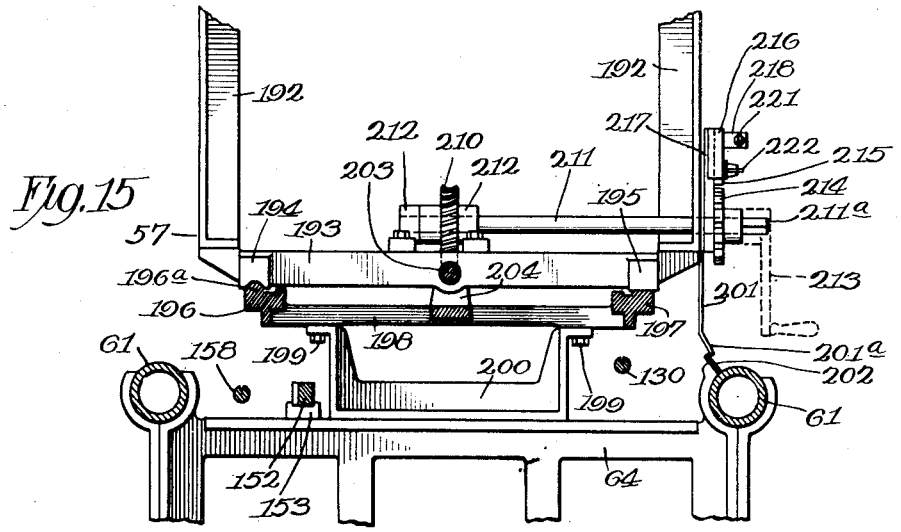
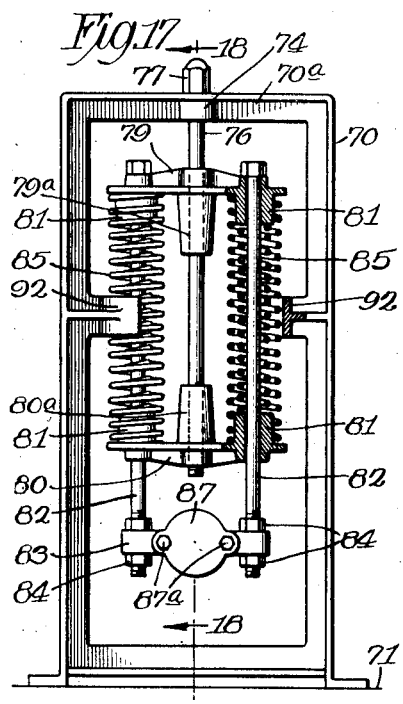
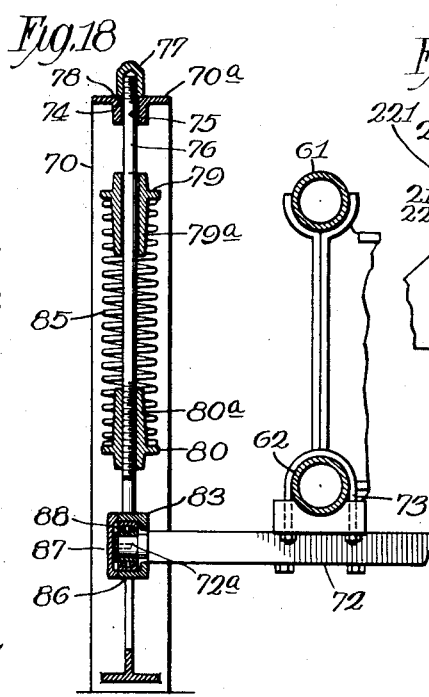
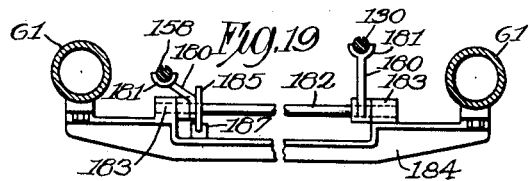
Inventor:
Alexander T. Koppe
By Rector, Hibben, Davis and Macauley, Attys.

Feb. 23, 1932.  A. T. KOPPE  1,847,010
PRECISION CAMERA
Filed Oct. 19, 1926  14 Sheets-Sheet 7
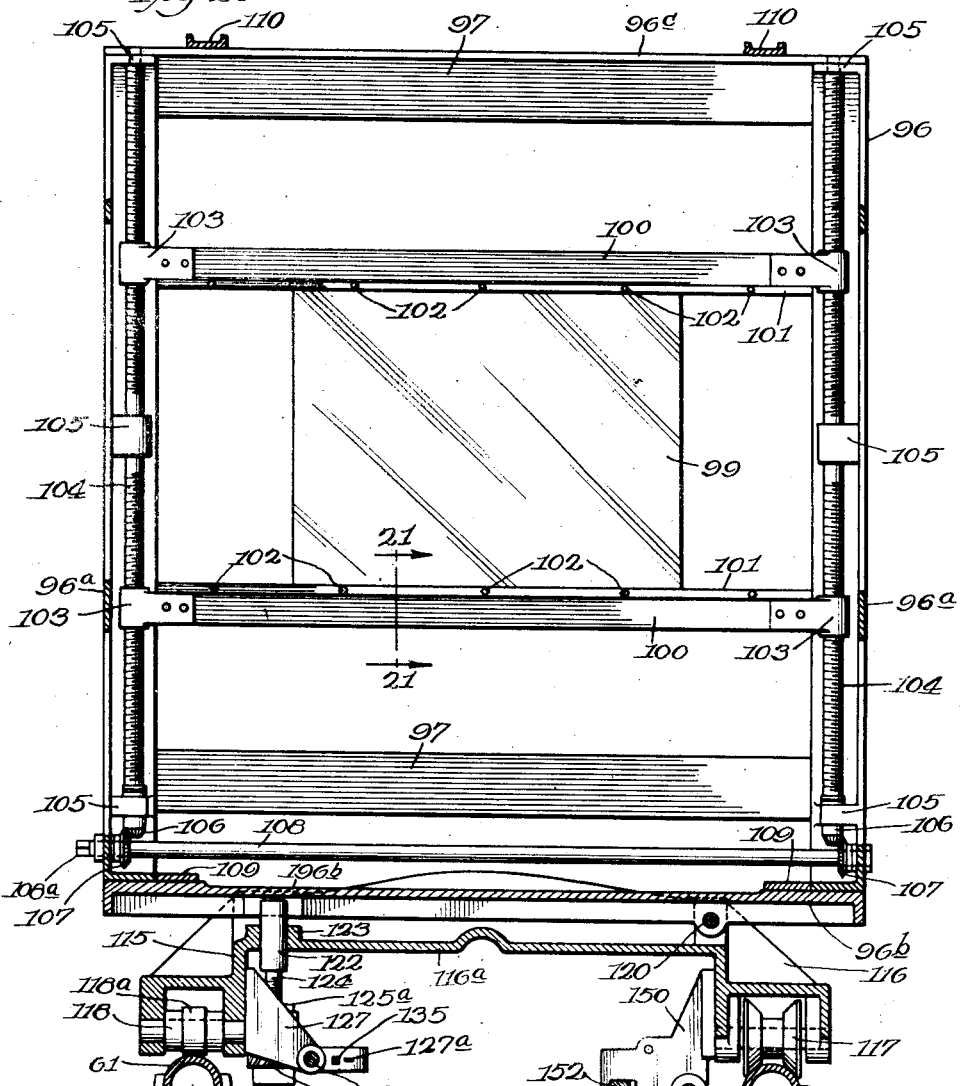
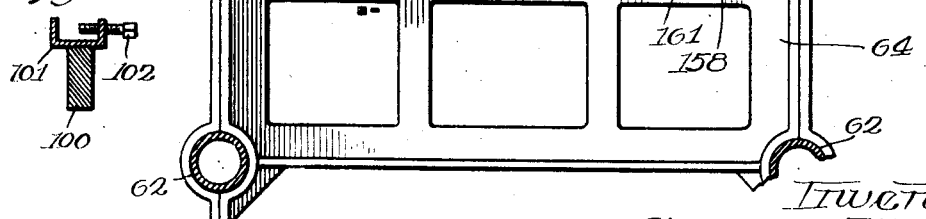

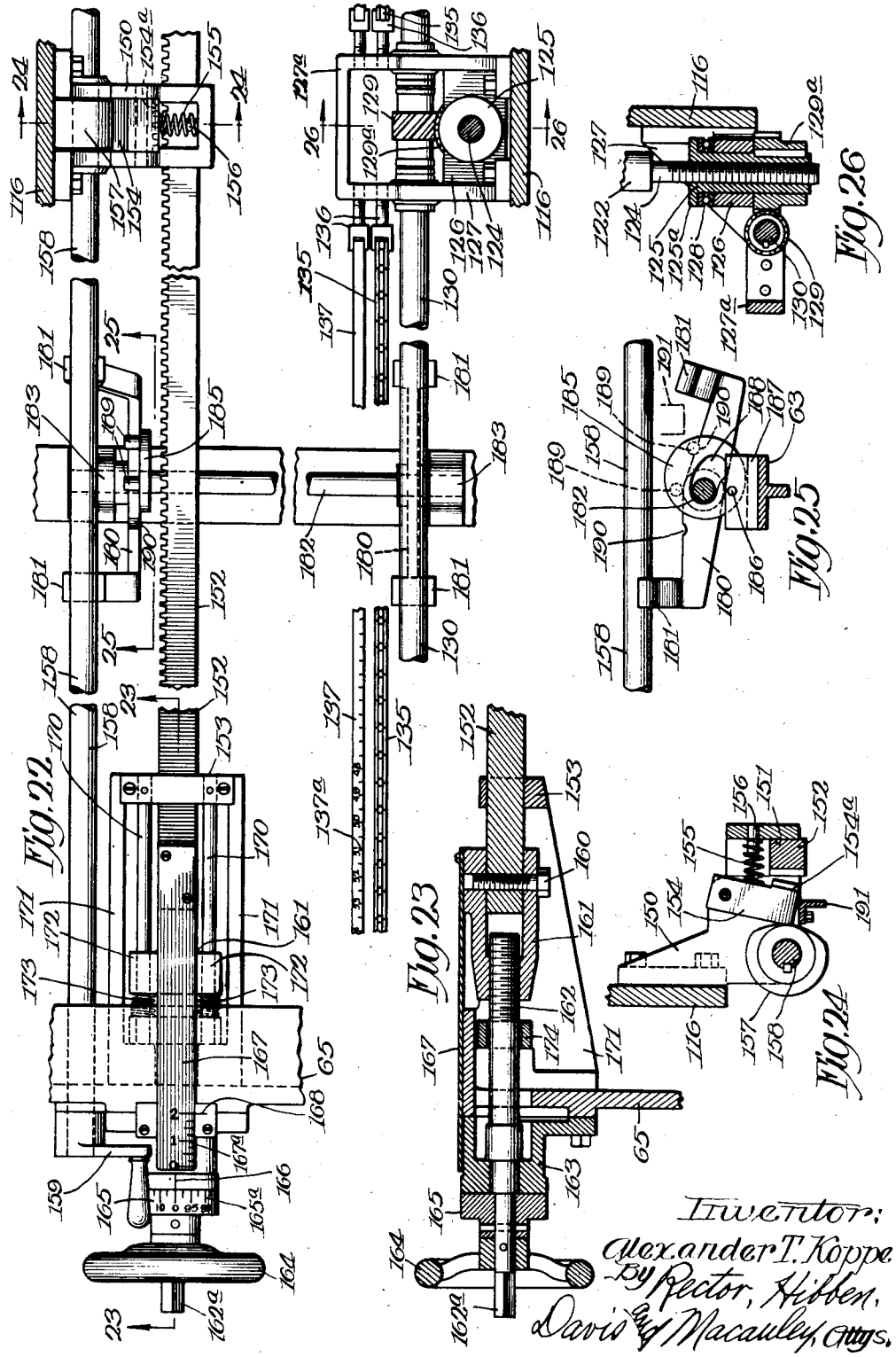

Feb. 23, 1932.  A. T. KOPPE  1,847,010
PRECISION CAMERA
Filed Oct. 19, 1926  14 Sheets-Sheet 9
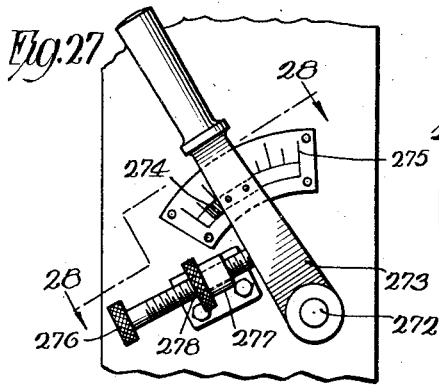
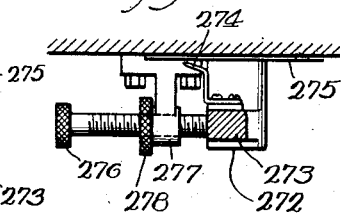
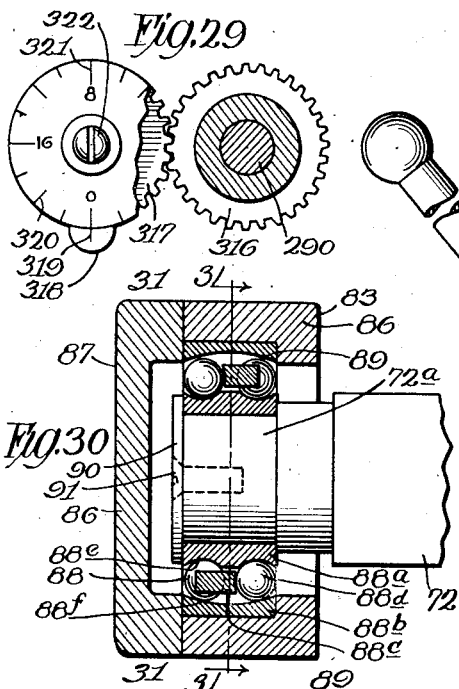
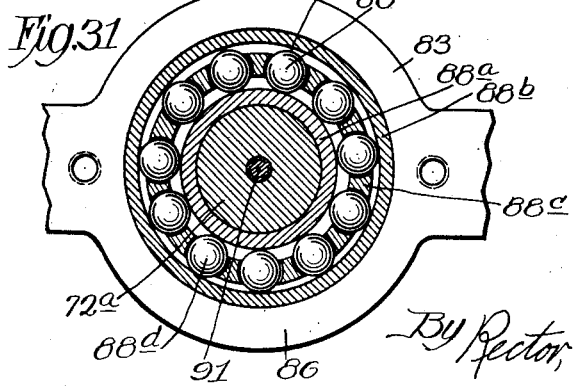
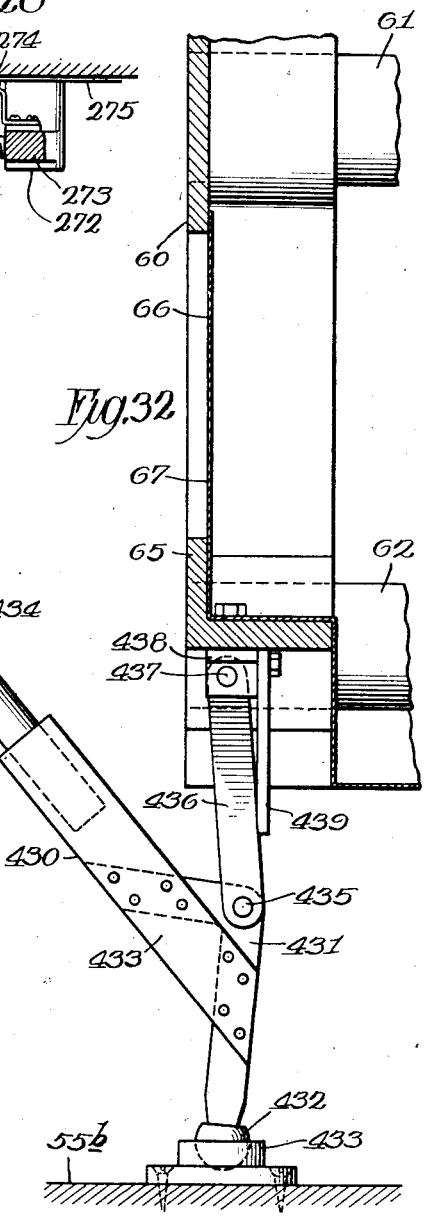
Inventor
Alexander T. Koppe
By Rector, Hibben, Davis & Macauley
Attys

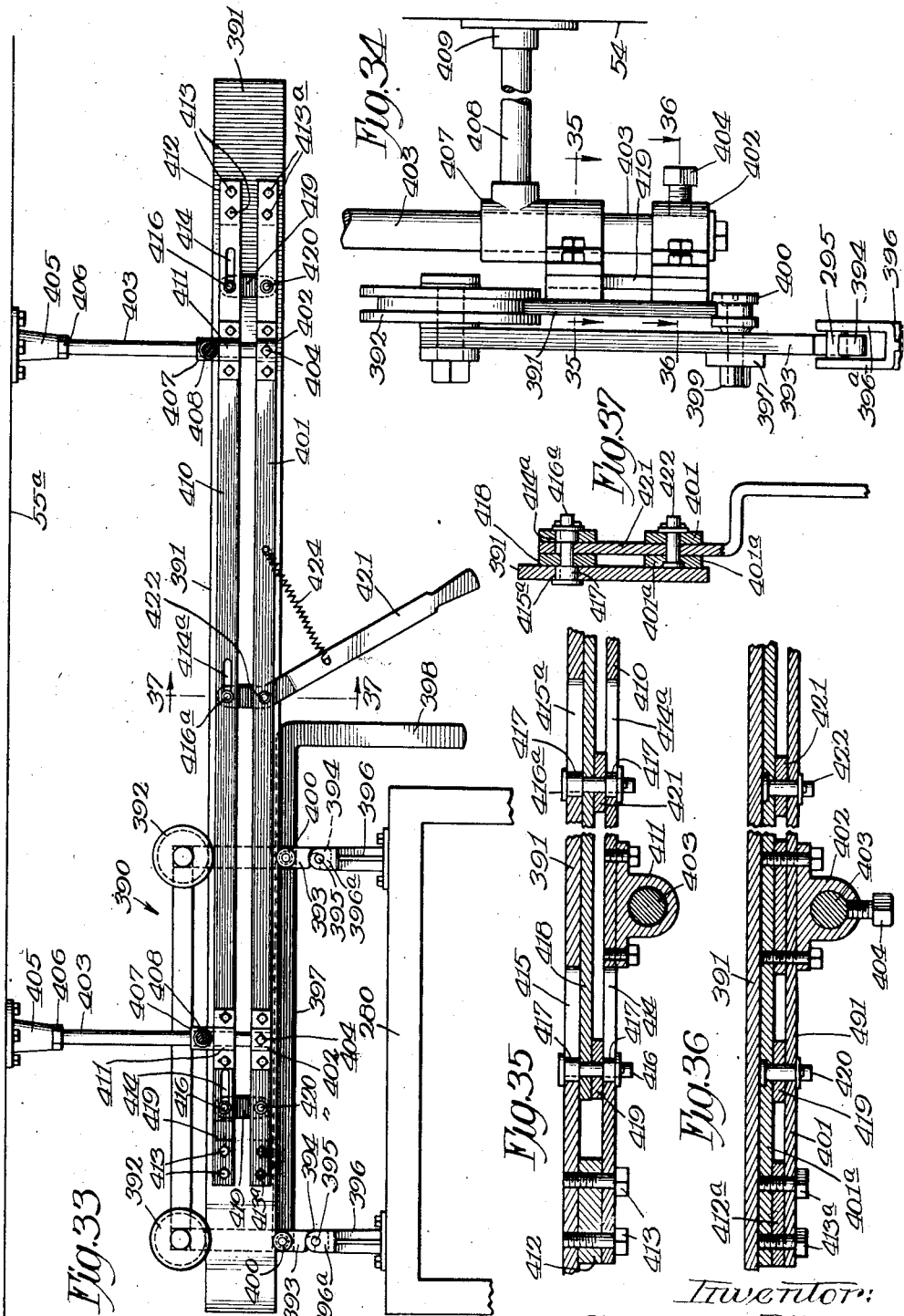

Feb. 23, 1932.   A. T. KOPPE   1,847,010
PRECISION CAMERA
Filed Oct. 19, 1926   14 Sheets-Sheet 11
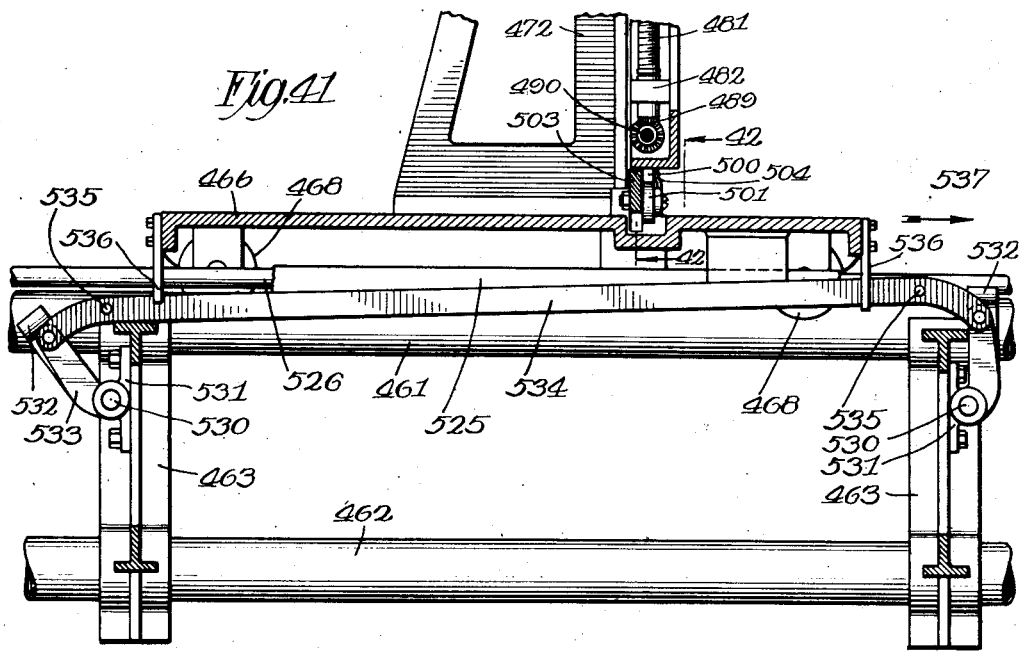
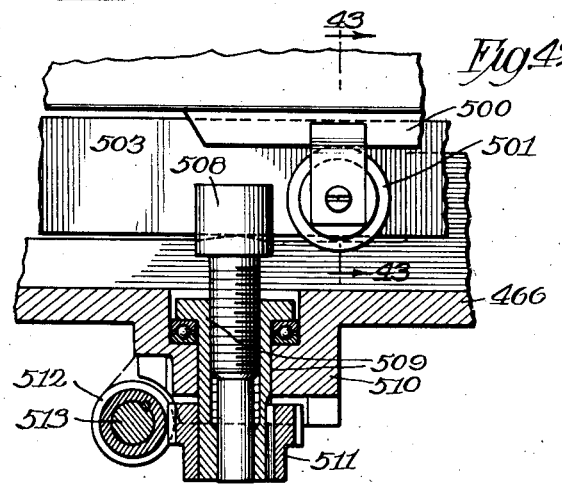
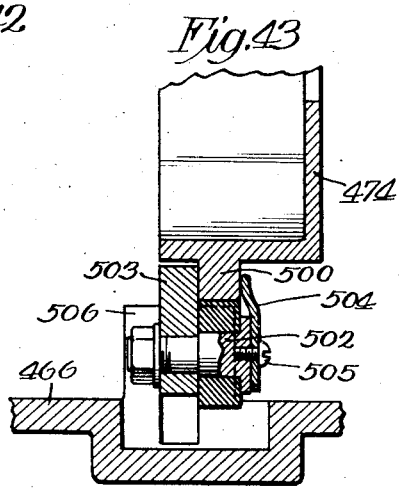
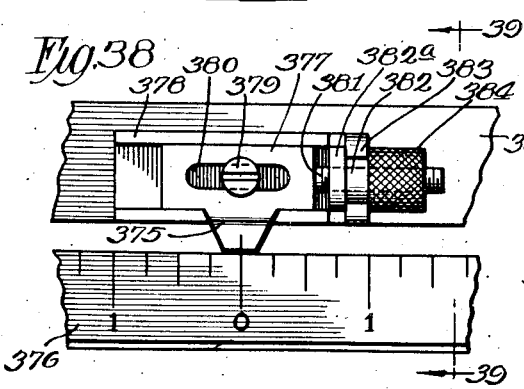
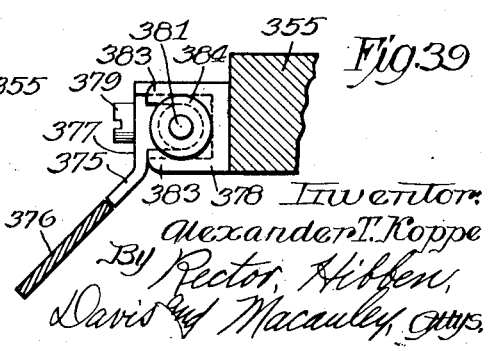
Inventor:
Alexander T. Koppe
By Rector, Hibben,
Davis and Macauley, Attys.

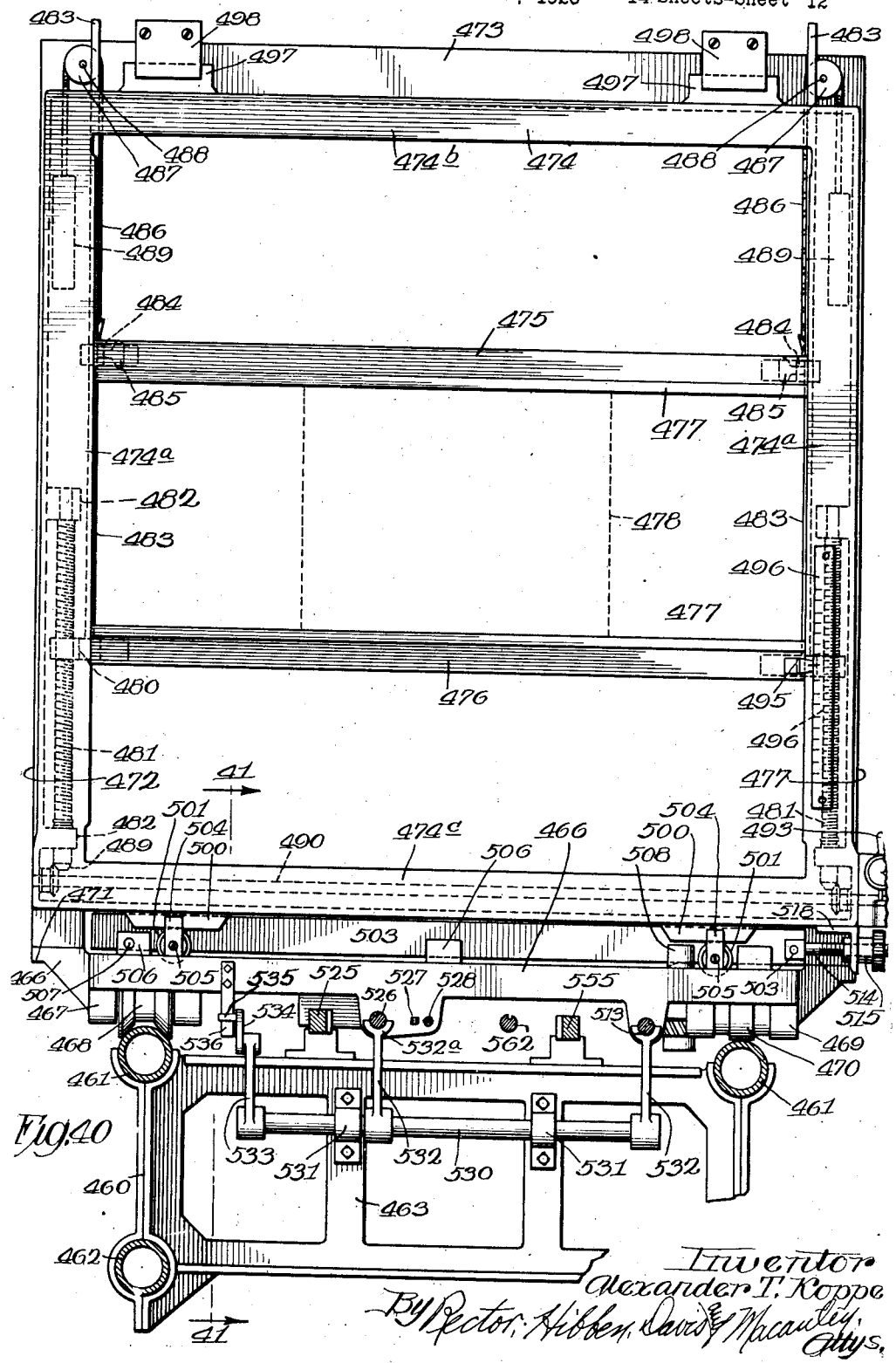

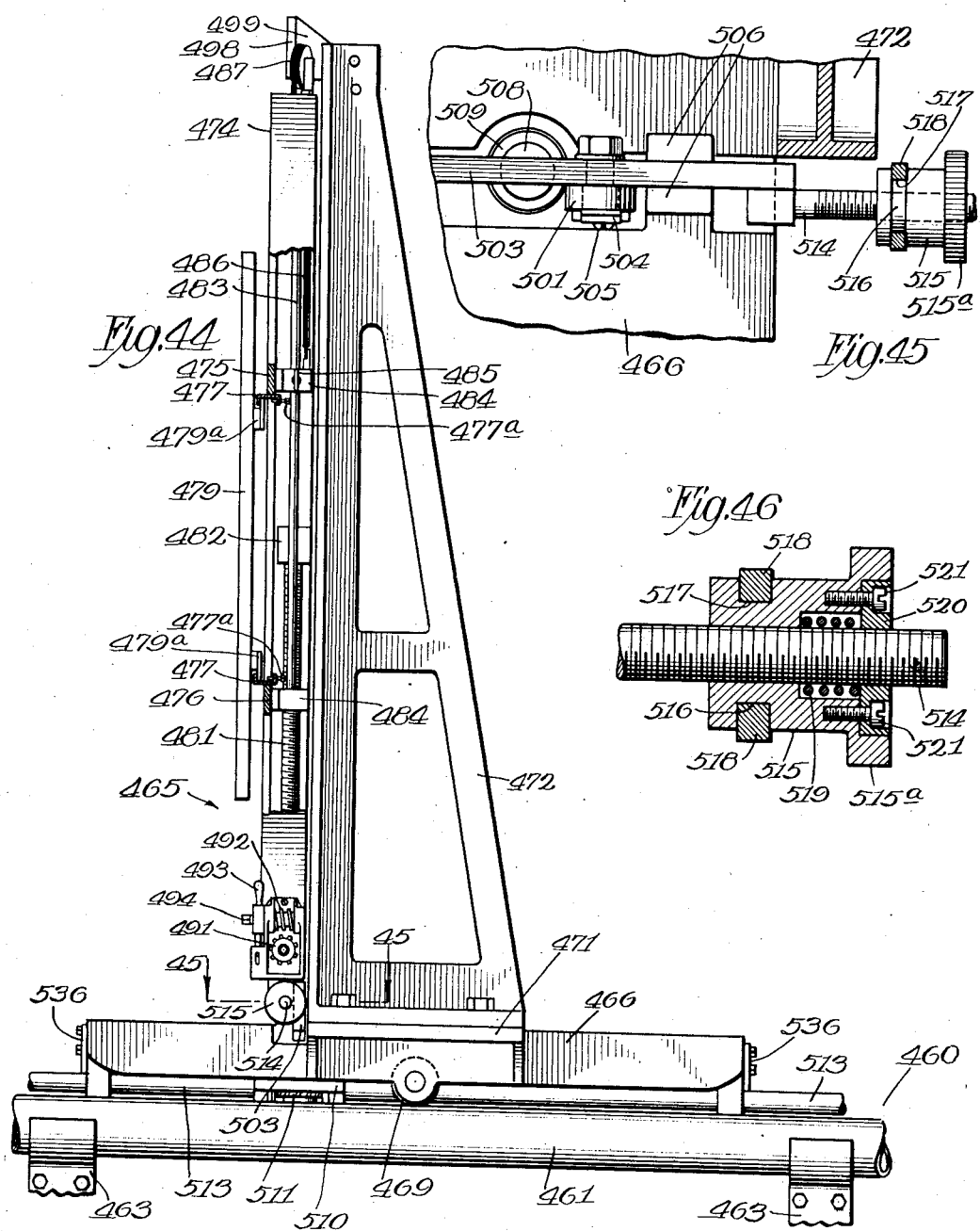

Feb. 23, 1932.  A. T. KOPPE  1,847,010
PRECISION CAMERA
Filed Oct. 19, 1926  14 Sheets-Sheet 14
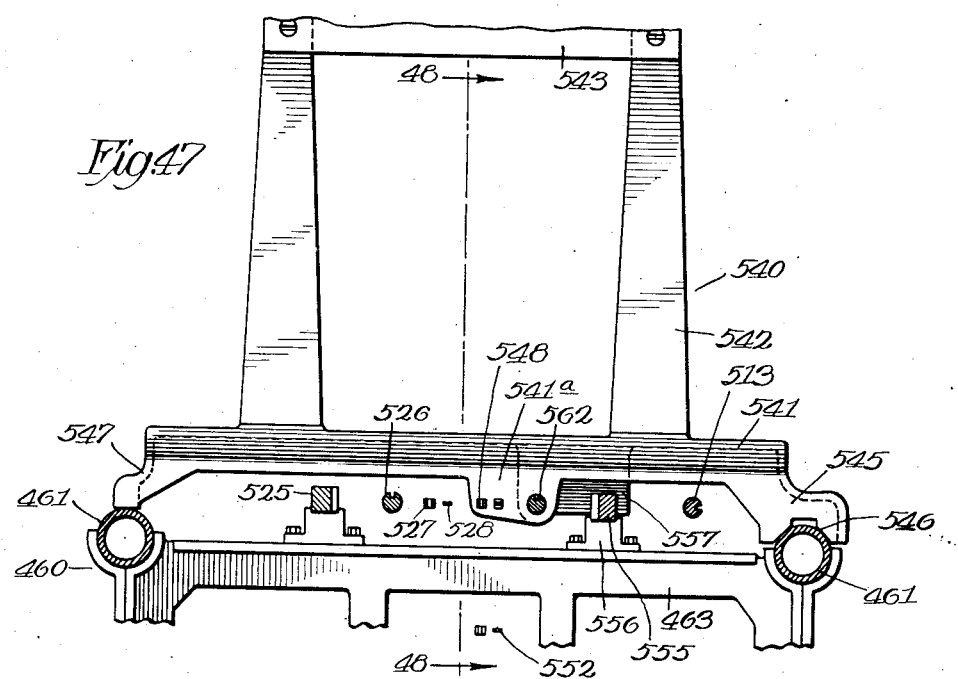
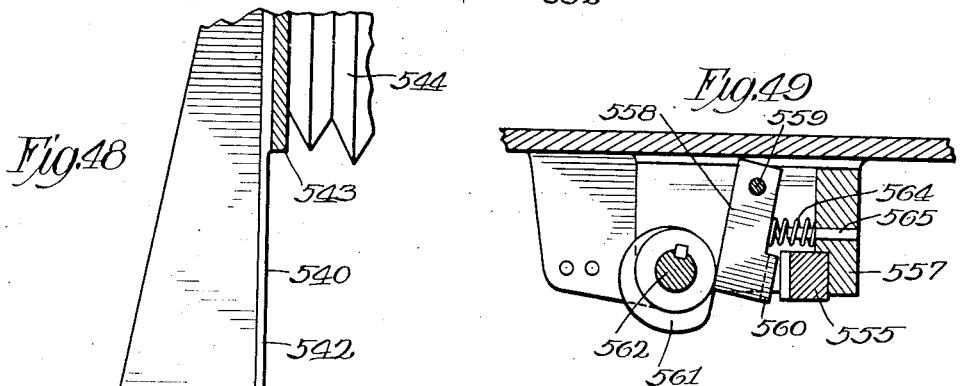
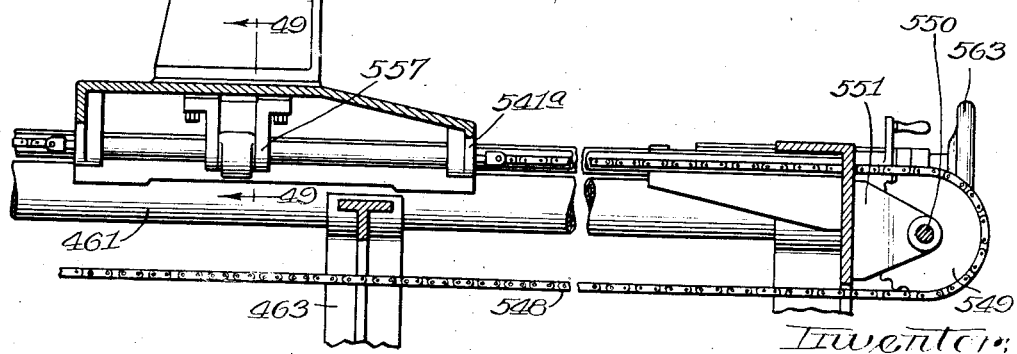
Inventor:
Alexander T. Koppe
By Rector, Hibben, Davis & Macauley, Attys.

Patented Feb. 23, 1932

1,847,010

UNITED STATES PATENT OFFICE

ALEXANDER T. KOPPE, OF CHICAGO, ILLINOIS, ASSIGNOR TO DIRECTOPLATE CORPORATION, OF CHICAGO, ILLINOIS, A CORPORATION OF ILLINOIS

PRECISION CAMERA

Application filed October 19, 1926. Serial No. 142,742.

This invention relates to precision cameras and its purpose is to provide improved apparatus for photographically reproducing, with or without increase or decrease in size, one or more subjects or copies carried by either transparent or opaque sheets, in such a manner that the various subjects will be precisely located in definite positions so that they will register exactly with each other in size, position and relative location of parts. The invention may be employed with particular advantage in the lithographic and printing arts for reproducing and effecting the necessary color separation of the various parts of the colored copy or subject which is to be reprinted in various colors with or without enlargement or decrease in size.

The principal object of the invention is to provide a precision camera comprising a copy holder on which the subject is mounted, a lens carrier, a screen holder and a plate holder in combination with improved means for effecting the individual adjustment and relative adjustment of these parts to bring about the projection and photography of the subject. A further important object of the invention is to provide a precision camera comprising a full floating camera stand whereby the relative adjustments and positions of the parts of the camera proper are not affected or distorted by vibrations of the building in which the camera is mounted. A further object of the invention is to provide a negative plate holder comprising improved means for effecting the adjustment of the position of the negative with respect to the focal axis of the lens of the camera. Still another object of the invention is to provide improved screen adjusting mechanism whereby all parts of the screen and its holder may be adjusted in unison toward or from the plate and plate holder. Another object of the invention is to provide improved mechanism for effecting a coarse adjustment and a fine adjustment of the lens carrier for the purpose of accurately positioning the lens in the operation of focusing the camera. A further feature of the invention is the provision of improved means for supporting the bellows of the camera to permit movement thereof during the adjustment of the lens carrier or at other times. Still another important object of the invention is to provide an improved copy board holder together with improved means for effecting a coarse adjustment and a fine adjustment thereof longitudinally of the focal axis of the camera. A further feature is the provision of improved means for effecting an adjustment of the copy board holder transversely of the focal axis of the lens for the purpose of securing the desired vertical and horizontal alignment of the parts of the subject. Another object is to provide a copy board holder in combination with adjusting means therefor operated by shafts extending to the rear end of the camera and having improved means for supporting intermediate parts of said shafts and permitting the copy holder to pass by said supporting means. Other objects of the invention relate to various features of construction and arrangement which will appear more fully hereinafter.

The nature of the invention will be more fully understood from the following specification taken with the accompanying drawings in which one embodiment is illustrated. In the drawings, Figure 1 shows a side elevation of the improved camera with a part of the dark room walls illustrated in vertical section; Fig. 2 shows a top plan view of the improved camera with the dark room walls illustrated in horizontal section; Fig. 3 shows an enlarged rear elevation of the adjusting mechanism for effecting an adjustment of the plate holding bars vertically in the plate holder frame; Fig. 4 shows a detailed sectional view taken on the line 4—4 of Fig. 3; Fig. 5 shows a longitudinal detailed section on the line 5—5 of Fig. 1, illustrating the micrometer mechanism for effecting an adjustment of the plate holder frame transversely of the focal axis of the camera; Fig. 6 shows a rear elevation of the camera and plate holder frame, illustrating a part of the plate holder frame in vertical section; Fig. 7 is a detailed elevation showing the connection of one of the counterweight chains with the upper plate holding bar of the negative plate holder illustrated in Fig. 6; Fig. 8 shows a detailed sectional view on the line 8—8 of Fig. 6, illustrating the means for securing the negative plate or other plate in position on the upper plate holding bar; Fig. 9 shows a longitudinal section through the rear end of the camera on the line 9—9 of Fig. 6, illustrating the plate holder, screen holder and adjacent parts; Fig. 10 is a vertical section taken on the line 10—10 of Fig. 9 illustrating various parts of the screen holder; Fig. 11 is a vertical section taken on the line 11—11 of Fig. 10 illustrating the mechanism for effecting the adjustment of the screen holder longitudinally of the focal axis of the camera toward and from the plate holder; Fig. 12 shows a detailed section on the line 12—12 of Fig. 10 and extending through the negative plate holder; Fig. 13 is a vertical section taken on the line 13—13 of Fig. 10, illustrating the means for securing the screen holder on the screen holder bars; Fig. 14 shows a detailed section taken on the line 14—14 of Fig. 10, illustrating the gripping means engaging the edge of the screen; Fig. 15 shows a transverse section taken on the line 15—15 of Fig. 1, illustrating the mounting of the lens carrier and the means for effecting a coarse adjustment thereof longitudinally of the focal axis of the lens; Fig. 16 shows an enlarged side elevation, looking toward the left as viewed in Fig. 15, of the mechanism for locking the coarse lens adjusting mechanism against movement; Fig. 17 shows a side elevation of one of the supports for the camera stand, illustrating the resilient mounting of the stand, a portion of the support and its cooperating parts being illustrated in vertical section; Fig. 18 shows a vertical section taken on the line 18—18 of Fig. 17; Fig. 19 is a transverse section taken on the line 19—19 of Fig. 1, illustrating the intermediate supports for the longitudinal shafts by which the adjustment of the copy board carrier is controlled; Fig. 20 is a transverse section taken on the line 20—20 of Fig. 1, illustrating the mounting and adjustment of holding bars, for a transparent plate, embodied in the copy board carrier and illustrating also the means for effecting a transverse tilting movement of the copy board carrier with respect to the longitudinal axis of the camera; Fig. 21 is a detailed section taken on the line 21—21 of Fig. 20, illustrating the means for securing the transparent copy plate in the copy holder; Fig. 22 is a top plan view of the major portions of the mechanism for effecting a fine adjustment and a coarse adjustment of the copy board carrier of the camera; Fig. 23 is a detailed vertical section taken on the line 23—23 of Fig. 22; Fig. 24 is a detailed section taken on the line 24—24 of Fig. 22, illustrating one of the cams and cooperating parts for controlling the operation of the fine adjusting mechanism of the copy board carrier; Fig. 25 is a detailed vertical section taken on the line 25—25 of Fig. 22, illustrating one of the tilting supports for an intermediate part of one of the longitudinal shafts for controlling the adjustment of the copy board carrier and the locking of the adjusting mechanism; Fig. 26 is a transverse sectional view taken on the line 26—26 of Fig. 22, illustrating the screw adjusting mechanism for effecting a transverse tilting of the copy board carrier frame; Fig. 27 shows an enlarged side elevation of the operating handle and cooperating parts for effecting the adjustment of the screen holder toward and from the plate holder; Fig. 28 shows a detailed section taken on the line 28—28 of Fig. 27; Fig. 29 is an enlarged detailed view, partially in vertical section, showing the micrometer screw adjustment for effecting vertical adjustment of the negative plate holding bars; Fig. 30 is a detailed vertical section on an enlarged scale, illustrating one of the roller bearings embodied in the spring suspension illustrated in Figs. 17 and 18, whereby the ends of the supporting axles of the camera stand have free turning movements with respect to their supports; Fig. 31 shows a vertical section taken on the line 31—31 of Fig. 30; Fig. 32 is a partial vertical section through the rear end of the camera showing the jack or toggle by which the rear end of the camera stand may be removed from its spring suspension and positively supported when it is desired to remove the negative plate holder from its normal position at the rear of the screen carrier; Fig. 33 shows a rear elevation of the overhead mechanism which is employed for moving the negative plate carrier laterally from its normal position at the rear of the screen carrier; Fig. 34 shows an end elevation of the mechanism illustrated in Fig. 33; Fig. 35 is a horizontal section taken on the line 35—35 of Fig. 34; Fig. 36 is a horizontal section taken on the line 36—36 of Fig. 34; Fig. 37 is a vertical section taken on the line 37—37 of Fig. 33; Fig. 38 is an enlarged front elevation of the means for adjusting the pointer for indicating the position of the plate holding frame transversely of the camera; Fig. 39 is a section taken on the line 39—39 of Fig. 38; Fig. 40 shows a section taken transversely of a modification of the camera illustrated in the figures heretofore described, showing a modified subject plate holder with means for adjusting it vertically and laterally and including modified means for supporting the bearing shafts at intermediate points longitudinally of the machine; Fig. 41 is a vertical section taken on the line 41—41 of Fig. 40; Fig. 42 shows a detailed vertical section taken on the line 42—42 of Fig. 41; Fig. 43 shows a detailed section taken on the line 43—43 of Fig. 42; Fig. 44 shows an enlarged side elevation of the structure illustrated in Fig. 40, with parts thereof broken away to reveal the means for holding and adjusting the subject plate; Fig. 45 shows a horizontal section taken on the line 45—45 of Fig. 44;

Fig. 46 shows a horizontal section through the adjusting screw illustrated in Fig. 45; Fig. 47 shows a vertical section taken transversely through a modified form of construction, illustrating modified means for mounting and moving the lens carrier; Fig. 48 shows a vertical section taken on the line 48—48 of Fig. 47; and Fig. 49 shows an enlarged detail section taken on the line 49—49 of Fig. 48.

Generally speaking, the principal parts of the camera include the negative holder frame 50 located normally at the rear end of the screen housing 51 and arranged to receive the light through a bellows 52 which has its rear end connected by a flange or strip 53 around an aperture in the wall 54 of the dark room 55 in which the screen housing and negative holder frame are located. The bellows 52 is mounted at an intermediate point on the bellows support 56 and the forward end of the bellows is connected to the lens carrier 57 having mounted thereon the usual lens board carrying a lens 58 which is provided with a removable cap and other features common to lenses intended for this purpose. In addition to these principal parts, the camera includes a copy board carrier 59 which is mounted, together with the negative holder frame, screen housing, bellows support and lens carrier, on the camera stand 60. This stand comprises four longitudinal tubular frame members of cylindrical cross-section including two upper frame members 61 and two lower frame members 62, the top members 61 being adapted to serve as rails for supporting the copy board carrier in its travel, as hereinafter more fully described. The rails 61 and 62 are connected at the front end of the camera by a front supporting truss frame 63 and these rails are connected at a plurality of intermediate points by the intermediate truss frames 64. The rear ends of the rails 61 and 62 are connected by the rear truss frame member 65, the openings of which are closed by a sheet metal plate 66, as shown in Fig. 6, to prevent the passage of light therethrough. The portions of the rails 61 and 62 which are immediately in front of the rear frame 65 are enclosed by a housing 67 which has its forward end connected to the wall 54 of the dark room by means of a flexible light excluding shield or bellows 68, thus permitting the rear end of the camera stand to move relatively to the dark room wall without permitting the access of light to the screen housing and negative holder frame.

The negative holder frame 50, the screen housing 51, lens carrier 57 and copy board carrier 59 are provided with certain adjusting mechanism, as hereinafter described, for securing the desired relative positions of the parts with respect to the lens and for the purpose of securing the desired enlargement or reduction in the size of the subject being reproduced and, in order that the vibrations of the building or other object which serves as a support for the camera, may not affect the relative adjustment of the parts of the camera and thus throw them out of focus or proper alignment, the camera stand 60 carrying the parts heretofore referred to is mounted so that it is substantially floating and freely movable with respect to four supporting frames 70 which are fixed on the floor or other support 71. The frames 70 are arranged in pairs with those of each pair on opposite sides of the camera stand which is provided on its under side with a pair of transverse axles 72 secured to the lower rails 62 by cams 73 arranged to project into the openings of the supporting frames 70, as shown particularly in Figs. 17 and 18. The frames 70 are rectangular in form and the transverse top frame members 70$^a$ thereof are provided with bosses 74 having apertures 75 therethrough which are loosely engaged by rods 76 having nuts 77 threadedly engaging the upper ends thereof and resting on the upper surfaces of the top frame members 70$^a$. The contacting surfaces of the nut 77 and the frame members 70$^a$ are rounded as shown at 78 to facilitate the angular movement of the rod 76 within the limits permitted by the sizes of the apertures 75. Each rod 76 slidably engages the hub 79$^a$ of an upper spring retaining member 79 and the lower end of each rod 76 threadedly engages the hub 80$^a$ of a lower spring retaining member 80. These spring retaining members are provided with bosses 81 at their opposite ends and these bosses are provided with apertures which are slidably engaged by bolts 82 having their heads resting on the upper sides of the upper spring retaining member 79 and having their lower ends extending through the lower spring retaining member 80 and engaging apertures in the opposite arms of a bearing plate 83, the bolts 82 being secured in adjusted position with respect to the connecting bearing plate by means of nuts 84. Coil springs 85 are mounted on the bolts 82 between the retaining members 79 and 80 with their ends engaging the bosses 81 so that the weight carried by the bolts 82 is suspended on these springs. The intermediate part of each bearing plate 83 is enlarged to form a housing 86 closed by a removable cap 87 secured in place by the cap screws 87$^a$ and which housing is arranged to contain a ball bearing unit 88 mounted on the cylindrical extremity 72$^a$ of one of the axles 72 of the camera stand. The construction of the ball bearings 88 is illustrated more particularly in Figs. 30 and 31, where the bearing 88 is shown as comprising an inner bearing ring 88$^a$, an outer bearing ring 88$^b$, a ball retaining ring 88$^c$ and a plurality of spherical balls 88$^d$. The retaining ring 88$^c$ is in the form of an annular ring having ball retaining notches formed in opposite sides thereof in staggered relation so that the balls 88$^d$ are retained in alignment with the grooves 88$^e$ which are formed in the inner bearing ring 88$^a$. The outer bearing ring 88$^b$ is provided on its inner side with a curved surface 88$^f$ which conforms substantially to the surface of a sphere and this surface has a larger diameter than the diameter of a sphere closely fitting the balls 88$^d$ when these balls are in contact with the grooves 88$^e$, so that a clearance 89 is normally provided above the uppermost balls, as shown in Fig. 30. The inner bearing ring 88$^a$ is secured to the end of the axle 72 by means of a plate 90 and a screw 91 and the loose engagement of the balls 88$^d$ with the spherical surface 88$^f$ permits a very great freedom of movement of the bearing housing 83 with respect to the end of the axle so that the bearing plate has a substantially free turning movement in all directions and any movements which are imparted to the bearing plate through the springs 85 mounted on the bolts 82 will merely cause turning movements of the bearing plates without affecting the stability of the axle 72 and the camera stand 60 mounted thereon. The side members of the supporting frames 70 are provided with integral U-shaped guides 92 to prevent excessive swaying of the camera stand during the shifting of the copy board carrier truck to position.

In the operation of the apparatus, the copy or subject to be reproduced by the camera is placed on the copy board carrier 59. If this copy is carried on an opaque sheet and is to be photographed by light reflected therefrom into the lens of the camera, the copy sheet is tacked or otherwise secured on the copy board 95 which is a wooden board mounted vertically on the rear side of the carrier frame 96. This frame is provided with a pair of horizontal copy board rails 97 provided with longitudinal grooves which are slidably engaged by tongues formed on the bars 98 which are secured to the copy board, as shown in Fig. 1, thus permitting the copy board to be removed by sliding it sidewise transversely to the longitudinal axis of the machine. When the subject to be photographed is carried by a transparent plate or the like, the copy board 95 is removed and the transparent plate 99 carrying the subject is mounted between the horizontal plate rails 100, as shown in Fig. 20. The rails 100 are provided along their opposing edges with channel bars 101, one wall of each channel having a series of set screws 102, as shown particularly in Fig. 21, so that these set screws can be tightened to hold the subject plate 99 in place after it has been moved to the desired position on the channel bar. The rails 100 are provided at their ends with threaded members 103 which are threadedly engaged by the vertical adjusting screws 104 journaled in bearings 105 carried by the side frame members 96$^a$ of the supporting frame 96. Beveled gears 106 are secured to the lower ends of these adjusting screws and are arranged to mesh with other beveled gears 107 fixed on a transverse shaft 108 which is journaled in bearings carried by the frame members 96$^a$ and provided at one end with a squared portion 108$^a$ adapted to be engaged by a crank which may be operated to effect the adjustment of the subject plate 99 in a vertical plane. A pair of plates 109 extend forwardly from the lower frame member 96$^b$ of the carrier frame 96 and two other plates 110 extend rearwardly from the top of the member 96$^c$ thereof. These plates 109 and 110 have bars 111 secured thereto and these bars are provided on their opposing faces with horizontal grooves adapted to be slidably engaged by the removable light diffusing glass plates 112. The bars 111 also have secured thereto and extending forwardly therefrom a light diffusing hood 113 which is a funnel-shaped member formed preferably of sheet metal having a light reflecting inner surface arranged to concentrate the light rays and project them through the subject plate 99. When a transparent subject plate 99 is being employed the light passes through the hood 113 from a source of light located at the forward end of the machine but when the subject is placed on the copy board 95, the source of light is located between the copy board and the lens, but out of the focal axis of the lens, and the light is reflected from the subject to the lens.

The frame 96 of the copy board carrier 59 is mounted on a truck 115 having the form illustrated particularly in Figs. 1 and 20. This truck comprises a frame 116 having at one side a pair of grooved rollers 117 which are adapted to travel on one of the upper rails 61 of the camera stand. At the other side of the machine, the truck frame 116 carries a single roller 118 having a cylindrical bearing surface 118$^a$ adapted to travel on the top of the other rail 61, the upper surface of this rail being preferably flattened to coact with the surface of the roller. Thus, the truck 115 has a three-point support on the camera stand and retains its stability in all of its positions without tilting or rocking.

In order that the subject carried by the copy board 95 or the subject plate 99 may be positioned properly with respect to horizontal and vertical lines, the frame 96 of the copy board carrier is mounted to have a tilting movement on the truck 115. For this purpose, the frame 96 is mounted at one side on a pivot 120 and at the other side of the truck, the bottom frame member 96$^b$ is engaged by a plunger 122, which slides in a boss 123 formed in the top frame member 116$^a$ of the truck, as shown in Fig. 20. The plunger 122 is carried at the upper end of an adjusting screw 124, as shown particularly in Fig. 26, where it will be seen that the screw threadedly engages a sleeve 125 rotatably mounted in a hub 126 formed in the bracket 127 which is secured to the truck frame 116. A roller bearing 128 is interposed between the top flange 125ª of the sleeve and the upper end of the hub 126, and the lower end of the sleeve has a spiral gear 128 secured thereon to mesh with a spiral gear 129 which is fixed on a longitudinal adjusting shaft 130 extending parallel to the rails of the camera stand. This shaft 130 is journaled at the front end of the machine in the front frame 63 and at the rear end of the machine it is journaled in the frame 65 in addition to being supported at an intermediate point, as hereinafter described. At the rear end of the machine the shaft 130 extends through the frame 65 and is engaged by a crank 131 which may be manipulated by the operator in order to rotate the adjusting screw 124 and thereby tilt the carrier frame 96 until the copy or subject is in the desired horizontal position.

The copy board carrier 59 is adjusted longitudinally of the camera stand 60 by means of certain mechanism connected to the truck frame 115. This mechanism includes means for effecting a relatively rapid and coarse adjustment of the carrier to the approximate position desired and also mechanism for effecting a fine adjustment to the exact desired position after the coarse adjusting mechanism has been operated. The coarse adjusting mechanism comprises an endless sprocket chain 135 which is attached to an extension 127ª of the bracket 127, as shown in Figs. 20 and 22. The bracket extension merely serves as a continuation of the chain and is connected thereto by the coupling members 136. An endless graduated tape 137 is mounted to travel alongside of the chain 135 and this tape is similarly connected to the bracket extension 127ª. The sprocket chain 135 is mounted at the front and rear end of the machine on a sprocket wheel 138, and the tape 137 is similarly mounted at the front and rear ends of the machine on a grooved pulley 139 which is mounted to rotate with the adjacent sprocket wheel. At the front end of the machine the sprocket wheel and pulley are enclosed by a housing 140 and at the rear end of the machine the sprocket wheel and pulley are enclosed by a housing 141 having a slot 142 therein through which the position of the graduations 137ª on the tape may be observed with respect to an index mark 143, shown in Fig. 2. As illustrated particularly in Fig. 6, the sprocket wheel 138 and pulley 139 at the rear end of the machine are fixed on a shaft 144 which is journaled in bearings 145 carried by the rear frame member 55, and this shaft has fixed thereon a beveled gear 146 adapted to mesh with a pinion 147 fixed on the adjusting shaft 148 which is journaled in a bracket 149, as shown in Fig. 9, and provided with a squared projecting end 149ª adapted to be engaged by a crank. Upon applying the crank to the short shaft 148 and operating it, the endless chain 135 will cause the truck 115 of the copy board carrier to move on the rails 61 of the camera stand until the desired graduation on the tape 137 comes into position opposite the index mark 143 which is formed on the housing 142.

The mechanism for effecting a fine adjustment of the copy board carrier 59 is operatively connected to the carrier truck 115 through another bracket 150 which is secured to the truck frame 116 on the side thereof opposite the bracket 127, as shown in Fig. 20. As shown in Figs. 22 and 24, the bracket 150 is provided on its under side with a recess 151 which is slidably engaged by a rack bar 152. This rack bar extends longitudinally of the machine and is mounted to slide in bearings 153 which are carried by the camera stand 60. The rack bar is capable of being moved bodily in these bearings for the purpose of effecting a corresponding movement of the copy board carrier 59 and to effect that movement of the carrier when desired, means are provided for detachably connecting the rack bar with the bracket 150 secured to the carrier truck. As shown in Fig. 24, a detent block 154 is pivoted on the bracket 150 and provided with teeth 154ª adapted to mesh with the teeth of the rack bar when the detent block is forced toward the rack bar against the compression of a coil spring 155 mounted on a pin 156 secured to the bracket. The detent block 154 is engaged on the side thereof opposite the teeth 154ª by a cam 157 which is of such configuration that the rotation thereof will force the teeth of the detent into mesh with the teeth of the rack bar. The cam 157 is splined on a shaft 158 extending longitudinally of the machine so that the cam 157 may be operated in any position of the carrier truck 115 in which the teeth 154ª will mesh with the rack bar. The shaft 158 is journaled in the front and rear frame members 63 and 65, respectively, in addition to being supported between its ends as hereinafter described, and at the rear end of the machine the projecting end of the shaft has a crank 159 fixed thereon so that the operator may turn the shaft to operate the cam and thereby render the fine adjusting mechanism operative or inoperative, as desired. The rack bar 152 extends longitudinally of the machine parallel to the shaft 158 and adjacent the rear end of the machine it is connected by a bolt 160 with a coupling member 161. This coupling member is threadedly engaged by an adjusting screw 162 which is journaled in a bracket 163 secured to the end frame member 65, as shown in Fig. 23. The screw shaft 162 has a square extremity 162ª for engagement by a crank and is also provided with a hand wheel 164 located outwardly of a micrometer disk 165 which is secured on the shaft and provided with graduations 165ª which are adapted to be brought into register with an index mark 166 formed on the bracket 163, as shown in Fig. 22. A flat scale 167 is secured to the coupling member 161 and extends over the top surfaces of the end frame 65 and bracket 163 so that the position of graduations 167ª marked thereon may be observed with respect to an index mark 168 carried by a plate attached to the upper side of the bracket. Thus the relatively large movements effected by the turning of the adjusting screw 162 may be observed on the scale 167ª while the fractional parts thereof may be observed by the micrometer graduations 165ª. It will be apparent that after the operation of the coarse adjusting mechanism heretofore described for effecting an approximate positioning of the copy board carrier 59, the desired fine adjustment may be effected by turning the crank 159 to connect the rack bar with the carriage truck 115 and then operating the handle 164 to actuate the adjusting screw 162. In order that there may be no lost motion in the operation of the adjusting screw 162, a pair of rods 170 are mounted within the bracket 171 which carries the bearing 153 for the rack bar, as shown in Figs. 22 and 23, and these rods slidably engage the lugs 172 which are formed on the sides of the coupling member 161. Coil springs 173 are mounted on the rods 170 between the lugs 172 and the lugs 174 which are carried by the bracket 171, so that the springs normally tend to force the coupling member 161 away from the end frame member 65 and take up any lost motion which may be present between the threads of the adjusting screw and those of the coupling member.

Since the shaft 130 for effecting the tilting movement of the copy board carrier and the shaft 158 for controlling the connection of the carrier truck with the rack bar 152 are both relatively long, these shafts might sag and destroy the accurate adjustment of the parts of the camera unless means be provided for supporting them between their ends. A fixed support would interfere with the travel of the copy board carrier and its truck longitudinally of the machine and means have therefore been provided for supporting these shafts between their ends by a device which automatically tilts during the travel of the carrier truck to allow the truck to pass and to renew the support of the shafts immediately upon the passage of the truck. As shown particularly in Figs. 19, 22 and 25, this tilting support comprises a supporting lever 180 provided at its opposite ends with semi-circular bearings 181 either of which is adapted to move upwardly to engage the under side of one of the shafts 130 or 158. Two of the bearing levers 180 are provided, each adapted to support one of the longitudinal shafts, and these bearing levers are fixed on a transverse shaft 182 which is journaled in bearings 183 carried by the bracket 184 secured on two of the longitudinal rails 61 of the camera stand. When the shaft 182 is rocked in its bearings, the upwardly extending bearing members 181 are shifted, the bearing member on one end of each lever being passed out of engagement with its shaft while the bearing member at the other end thereof is simultaneously passed into engagement with its shaft. This rocking movement of the shaft 182 is effected by a cam disk 185 pivotally connected at 186 to a plate 187 mounted on the frame 64. The disk 185 is provided with an elongated curved slot 188 which is engaged by the shaft 182 and the upper part of the disk is provided with two projecting pins 189, each one of which is adapted to engage one of the notches 190 formed in the upper side of the adjacent lever 180 which is adapted to support the shaft 158. When the lever 180 and disk 185 are in the positions shown in Fig. 25, one of the pins 189 engages one of the notches 190 and holds the lever 180 in position wherein one of the bearing members 181 supports the shaft 158 and at the same time one of the bearing members 181 on the other lever 180 supports the shaft 130. When the truck 115 of the copy board carrier is moved along the rails 61 to a point adjacent the shaft 182, the bearing levers 180 are automatically tripped by the operation of the tripping member 191 which is secured to the under side of the bracket 150, as shown in Fig. 24, and which has a path of travel adapted to bring it into engagement with the uppermost one of the pins 189 carried by the disk 185. As soon as the tripping member 191 engages this pin, the other pin 189 is moved out of engagement with its notch 190, thereby releasing the lever 180 and upon further movement of the truck 115, the tripping member 191 rocks the disk 185 until the uppermost pin 189 engages the other notch 190 and rocks the lever 180 toward the left, as viewed in Fig. 25, to the extent permitted by the engagement of the shaft 182 with an end of the slot 188. During this tilting movement of the bearing lever, the other bearing members 181 which have been passed by the cam 157 and bracket 150, are elevated, thus renewing the support of the shafts 130 and 158 immediately upon the passage of the carrier truck 115. When this truck is moved in the other direction the operation is reversed so that the longitudinal shafts are at all times supported at a point midway between their ends.

The lens carrier 57 comprises two upright frame members 192 which carry the lens board and the lens 58 and these frame members are secured at their lower ends to a transverse base member 193 provided with bearing members 194 and 195 adapted to slide on the trackway 196 and 197, respectively, which are carried by the track frame 198. One of the bearing members 194 is provided on its under side with a groove adapted to fit over the V-shaped slideway 196ª of the member 196, thus preventing lateral displacement of the lens carrier and maintaining it accurately in position. The other block 195 of the lens carrier has a flat lower surface adapted to slide on the flat slideway formed by the upper surface of the trackway 197. The track frame 198 extends forwardly from the dark room wall 54 through a distance sufficient to allow for the greatest possible extension of the bellows 52 and this track frame is secured by bolts 199 to the laterally projecting flanges of a supporting frame 200 which is in turn secured to one of the intermediate frame members 64 of the camera stand. One of the side frame members 192 of the lens carrier has a pointer 201 extending downwardly therefrom and the extremity 201ª of this pointer is adapted to travel over a graduated scale 202 which is secured in position along one of the track members 61. The mechanism for moving the lens carrier to a desired position indicated on the scale 202 comprises a worm wheel 203 which is journaled at one end in the bearing bracket 204 extending upwardly from the track frame 198, as shown in Fig. 9, while the other end thereof is journaled in a bearing bracket 205 secured to the rear side of the auxiliary frame member 206 which is mounted on the rear end of the camera stand above the rear frame member 65. A graduated micrometer disk 207 is secured on the rear end of the worm shaft 203 and upon rotation of the shaft the position of the graduations may be observed with respect to an index mark 208 located on the upper side of the bearing bracket 205, as shown in Fig. 2. A handle 209 is secured to the extremity of the shaft 203 for engagement by the hand of the operator. The worm screw 203 meshes with a worm wheel 210 which is fixed on the horizontal operating shaft 211, as shown in Fig. 15. The shaft 211 is journaled in bearings 212 carried by the frame of the lens carrier and projects laterally through one of the side frame members 192 thereof, being provided at its end with a squared portion 211ª adapted to be engaged by a crank 213. When the crank 213 is operated to rotate the shaft 211, the worm 203 operates as a rack bar and the worm wheel 210 travels thereon to adjust the lens carrier 57 longitudinally of the camera to the approximate position determined by reference to the scale 202. A fine adjustment of the lens carrier may be effected by reversing the operation of the parts and rotating the worm screw 203 with the worm wheel 210 stationary. To permit this operation, the shaft 211 is provided with a toothed wheel 214 adapted to be engaged by a detent 215 mounted on a block 216. This block is mounted to slide on a guide member 217 and is adapted to be reciprocated vertically by a cam 218 which is mounted on a pin 219 secured to the guide. The cam 218 is located in an elongated slot 220 formed in the block 216 and it is turned by a handle 221. When the cam 218 is turned about the eccentrically located pivot 219, the block 216 is reciprocated on its guide to cause the detent 215 to engage or disengage one of the notches of the toothed wheel 214. The block 216 may be secured in adjusted position by means of a wing nut 222 engaging a stud 223 which projects through a slot in the face of the block. When the detent is in engagement with the toothed wheel 214, the worm screw 203 may be operated by the handle 209 to effect a fine adjustment of the lens carrier to the precise position desired.

In order that the bellows support 56 may be moved freely to accommodate itself to the position of the lens carrier 57 and to allow the necessary expansion or contraction of the bellows 52, the support is mounted on a truck 225 provided with rollers 226 which are adapted to travel on the trackways 196 and 197. The rollers 226 are provided with flanges 226ª which are adapted to extend inwardly at the sides of the trackways to maintain the truck 225 against lateral displacement. The bellows 52 is connected at its rear end to the bellows frame 227 which fits within the inwardly directed flange or strip 53 previously described as being secured to the wall 54 of the dark room 55, as shown in Fig. 9. This dark room wall 54 has an opening 228 which registers with the opening of the bellows and the lower part of the dark room wall is provided with another opening 229 which registers with the flexible light shield 68 and which permits the camera stand 60 and parts carried thereby to extend through the wall of the light chamber where the auxiliary frame member, previously referred to, is secured on the upper part of the camera stand with the forward portion thereof engaging the rear flange 198ª of the track frame. As shown in Figs. 6 and 9, the sheet metal wall 67 which is attached to the rear truss frame 65 of the camera stand extends laterally and downwardly beyond the camera stand to form a light shield and the forward edges of this sheet metal wall are provided with flanges 67ª which are attached to the annular strip 68ª which extends around the boundary of the flexible light shield 68. In this way light is excluded from the interior of the dark room wall while permitting the camera stand to move with respect to the stationary dark room wall 54.

The screen frame or housing 51 is mounted in the dark room 55 on the auxiliary frame 206 so that when a screen is in place the light will pass therethrough from the bellows to the negative plate located in the holder frame 50. As shown particularly in Figs. 9, 10, 11 and 12, the screen housing 51 comprises a rectangular frame 230 having vertical side walls 230$^a$, a lower wall 230$^b$ and a top wall 230$^c$. The side walls 230$^a$ are of channel form, as shown in Fig. 12, and the inwardly directed flanges of these walls at the front side of the housing are united at their corners with the flanges 230$^d$ which extend downwardly and upwardly, respectively, from the upper and lower walls of the housing, thus forming an opening 231 through which the light is received from the opening of the bellows 52. The screen 233 is shown as circular in form, being provided around its edge with a metallic rim 234 and this screen is secured to a rectangular screen holding frame 235 by means of clamps 236 which are secured to the frame and which engage the periphery of the rim 234. The metallic rim is provided with graduations 234$^a$ on the rear side thereof, toward the operator of the camera, so that the angular position of the screen can be determined in degrees, and this rim is further provided with a V-shaped outer edge 234$^b$, as shown particularly in Fig. 14, for engagement with the V-shaped notches 237$^a$ which are formed in the clamping blocks 237 forming parts of the clamps 236. The blocks 237 are carried by stems 238 having screw threaded extremities 239 which engage threaded apertures in the members 236 which are secured to the holder 235 so that the clamping blocks 237 may be adjusted to engage or disengage the rim of the screen and secure it in the desired angular position with respect to the graduated pointed extremities of the blocks 237. The lower part of the rim 234 of the screen rests on rollers 241 which are secured to the holder 235, these rollers being provided with V-shaped grooves to be engaged by the V-shaped edge 234$^b$ of the rim and two of the clamps 236 are provided for securing the screen in position.

The screen holder 235 is mounted on horizontal holding bars 244 which are T-shaped in cross-section, comprising horizontal plates 244$^a$ connected to the middle parts of vertical plates 244$^b$. Retaining blocks 245 are secured to the vertical plates 244$^b$ by screws 246 so that the fingers 246$^a$ which are carried by these retaining members extend downwardly over the upper plate 244$^a$ and upwardly beyond the edge of the lower plate 244$^a$, thereby projecting over the edges of the screen holder 235 which is forced against these fingers by the pressure blocks 247. These pressure blocks are slidably mounted on studs 248 which have coil springs 249 mounted thereon to force the pressure blocks against the face of the screen holder 235. The pressure blocks 247 are beveled, as shown at 247$^a$, to permit the convenient insertion of the edges of the screen holder. The two holding bars 244 are mounted for vertical adjustment on the adjusting screws 250 which threadedly engage the brackets 251 secured to the ends of the bars, as shown particularly in Figs. 10 and 12. The adjusting screws 250 are threaded in opposite directions from their middle parts so that upon rotation thereof the screen holding bars 244 are simultaneously adjusted toward or from each other. The two adjusting screws are mounted in bearings 252 which are secured to the angle bar supporting plates 253, one of these bars extending vertically at each side of the screen housing 230 adjacent the side frame members 230$^a$. The inwardly directed flanges 253$^a$ of these supporting bars extend into notches 254 which are formed between the ends of the holding bars 244 and the attached brackets 251, thus furnishing additional guides for the holding bars in their vertical travel. In order that the opposite ends of the holding bars may be adjusted simultaneously and uniformly, the lower ends of the adjusting screws 250 are connected through beveled gears 255 to a horizontal operating shaft 256 which is provided at one end with a squared portion 256$^a$ adapted to be engaged by a wrench or crank inserted through a slot 257 formed in one of the frame members 230$^a$ of the screen housing.

In addition to the vertical adjustment of the screen and its holder, heretofore described, these parts are adjustable bodily in a direction longitudinally of the axis of the lens by certain mechanism attached to the vertical supporting members 253. For this purpose, each supporting member 253 has the outer flange 253$^b$ thereof connected at each of its upper and lower ends to a horizontal slidable block 260, the connection being made by screws 261, as shown in Fig. 12. Each block 260 has a tongue and groove connection with a guide member 262 secured within the adjacent side frame member 230$^a$ of the housing, as shown in Fig. 10, so that the blocks 260 may be adjusted horizontally within the housing to carry with them the supporting members 253 and the screen holding bars 244. This sliding movement of the blocks 260 is effected by the vertical reciprocation of the traveling bars 264 which are mounted to slide in guideways 265 secured within the angles of the supporting members 253, as indicated in Figs. 11 and 12. Two of these guideways 265 are provided at each of the upper and lower ends of the traveling bars 264 and, between each pair of guideways, each traveling bar is pivotally connected to a crank member. The upper crank members 266 are pivoted at 267 on the bars 264 and are pivoted at 268 on supporting brackets 269 extending downwardly from the upper guide members 262. The lower ends of the traveling bars 264 are pivotally connected at 270 to cranks 271 which are fixed on a horizontal shaft 272 extending transversely of the screen housing and journaled in bearings 273 secured to the side walls of the housing. One end of the shaft 272 extends through a wall 230a of the housing and has an operating handle 273 secured thereon, as shown particularly in Figs. 10, 27 and 28. The handle 273 is provided on its inner side with a pointer 274 which is adapted to travel adjacent the face of a graduated scale 275 secured to the side wall of the housing. Upon movement of the handle, the rotation of the shaft 272 causes the crank arm 271 to move the traveling bars 264 vertically and at the same time the angular motion of the crank arm 271 causes a horizontal bodily movement of the sliding members 264 together with the supporting members 253, permitted by the movement of the blocks 260 in the guide members 262. Thus the screen 233 may be shifted longitudinally of the axis of the lens, toward or from the plate holder, and it may be secured in the desired position, indicated by the scale 275, through the operation of a set screw 276 which threadedly engages a bracket 277 secured to the side of the screen housing, as shown in Fig. 27, the extremity of this set screw being located in the path of movement of the handle 273 so that it may be brought into position against the face of the adjusted handle and then secured in that position by the lock nut 278.

The negative holding frame 50 comprises an integral rectangular frame structure 280 made up of vertical side walls 280a of channel cross-section which are connected by the top wall 280b of channel form and the lower wall 280c, also of channel form. This rectangular negative holding frame is mounted above the rear end of the auxiliary frame 260, as shown particularly in Fig. 9, and the lower wall 280c thereof is provided with a flange 281 which is adapted to travel on rollers 282 mounted on the inner web 206a of the auxiliary frame. The top wall 280b of the negative holding frame is provided with a pair of hook members 283 which are adapted to extend over a plate 284 secured to the top wall of the screen housing 230, thus retaining the negative holding frame in position. As illustrated in Figs. 6 and 9, the negative plate 285 is mounted between the lower plate holding bar 286 and the upper plate holding bar 287 which extend horizontally between the side walls 280a of the frame. The lower plate holding bar comprises an angle bar 286a having mounted on the upper horizontal flange thereof a plate engaging bar 286b of angle cross section, the upwardly extending flange 286c of which is adapted to engage the vertical face of the negative plate adjacent its edge while the edge of the negative engages the face 286d of the horizontal flange of the bar. This face 286d is inclined upwardly and rearwardly from the vertical flange 286c so that when the edge of the negative is placed in position, as shown in Fig. 6, it is retained in place by the inclined surface. The negative 285 is adapted to be positioned longitudinally of the bar 286 by means of a clamp 288 which extends over the horizontal flange of the bar and is secured in adjusted position thereon by means of the clamping screw 288a. When this clamp is in position, as shown in Fig. 6, it engages one lateral edge of the negative plate. The lower plate holding bar 286 has brackets 289 secured to the ends thereof and these brackets are threadedly engaged by the vertical adjusting screws 290 which are journaled in bearings 291 secured to the side frame members 280a of the frame. The brackets 289 also have fixed therein the vertically extending rods 292 which are slidably engaged by the brackets 293 secured to the upper plate holding bar 287. The upper and lower plate holding bars may be secured in fixed position with respect to each other by tightening the clamping screws 294 which engage the brackets 293 for the purpose of securing the upper plate holding bar in fixed position with respect to the rods. The upper plate holding bar 287 comprises an angle bar 287a having the lower horizontal flange thereof secured to the top horizontal flange 287b of the plate engaging bar 287c. The flange 287b has its lower surface inclined upwardly and inwardly toward the depending vertical flange 287d which engages the innermost vertical face of the negative plate 285, as shown in Fig. 8, and the inclined surface coacts with the edge of the negative plate to retain it against rearward movement in the camera. The negative plate is further secured in position by the pivoted gripper bar 295 which is provided with pivots journaled in the flanges 296 secured to the bar 287a. The gripper bar 295 has fixed thereon a plurality of spring fingers 297 which carry inwardly projecting lugs 298 at their lower ends. These lugs are provided with tips 298a of resilient material adapted to contact with the face of the negative, as indicated in Fig. 8, and the lugs are normally retained in engagement with the negative by means of leaf springs 299 which are secured to the plate holding bar and arranged to contact with either one of two right-angularly disposed flat faces of the gripper bar 295. When the gripper bar is in the position shown in Fig. 8, the leaf springs 299 retain the lugs 298 in engagement with the negative but when the gripper bar is turned upwardly through ninety degrees by the operation of the handle 300 the springs 299 engage the angularly disposed face of the gripper bar and retain it in position with the gripper fingers extending outwardly from the bar 287, thus permitting the negative plate to be conveniently inserted or withdrawn.

The brackets 293 at the ends of the upper plate holding bar 287 have upwardly extending threaded studs 301 secured therein, as shown in Fig. 7, and these studs are provided with laterally extending headed pins 302 adapted to be detachably engaged with the keyhole slots 303 which are formed in the plates 304 secured to the ends of the counterbalance chains 305. These chains extend upwardly and are passed around a grooved roller 306 mounted on pivots 307 extending upwardly from the top wall 280$^b$ of the negative holding frame. This top wall is provided with apertures 308 to permit the passage of the chain and the downwardly extending extremities of these chains are attached to the counterbalance weights 310, which counterbalance the weight of the upper holding bar.

Assuming that a negative plate 285 has been secured in position between the upper and lower plate holding bars and that these bars have been rigidly connected by tightening the clamping screws 294, the upper and lower plate holding bars and the negative plate may be adjusted vertically in unison by the operation of the adjusting screws 290, previously referred to. These adjusting screws are connected at their lower ends by beveled gears 311 with a transverse shaft 312 which is journaled in bearings 313 formed in the lower side walls of the frame, as shown in Fig. 6, and one end of the shaft 312 is projected beyond the frame and provided with a squared portion 312$^a$ adapted to be engaged by a crank which may be operated to effect the vertical adjustment of the negative plate. The operation of this crank is adapted to effect the approximate adjustment of the negative to the desired position but a final adjustment may be effected by the mechanism hereinafter described, the precise position of the negative plate being indicated by a micrometer disk illustrated particularly in Figs. 6 and 29. This indicating device comprises a gear 316 secured on the lower end of one of the adjusting screws 290 and arranged to mesh with a fine toothed pinion 317. A stationary lug 318 is provided with an index mark 319 and the position of the gear 317 with respect to the index mark is indicated by a micrometer disk 320 having graduations 321 thereon. This disk may be secured in any desired angular position with respect to the gear 317 by tightening the screw 322, thereby causing the disk to rotate with the gear to indicate fractional turns of the adjusting screw.

The fine adjustment of the position of the negative plate, which is indicated by the mechanism shown in Fig. 29, is effected by removing the crank arm from the squared extremity 312$^a$ of the shaft 312 and gradually turning this shaft by means of a worm wheel 325 fixed on the shaft and arranged to mesh with a worm 326 secured on a short operating shaft 327. As indicated particularly in Figs. 3 and 4, the operating shaft 327 is journaled in an eccentric sleeve 329 which is adapted to be rotated by a handle 330 secured on a collar 331 which is attached to the eccentric sleeve by a set screw 332. This collar is provided with a pair of right-angularly disposed recesses 333 either of which may be engaged by a pin 334 mounted to reciprocate vertically in a recess 335 formed in a boss 336 extending laterally from the housing 328. A coil spring 337 is mounted in this recess and tends normally to force the pin 334 upwardly against the collar 331. It will be apparent that when the crank is applied to the squared extremity 327$^a$ of the adjusting shaft 327, the rotation thereof will effect the gradual adjustment of the upper and lower negative holding bars until the negative plate 285 reaches the desired position, assuming that the eccentric sleeve 329 is in a position to cause the worm 326 to mesh with the worm wheel 325. When the operator wishes to dispense with this gradual adjustment, the eccentric sleeve 329 may be rotated by the handle 330 until the worm is moved out of mesh with the worm wheel whereupon the parts will be secured in that position by the engagement of the pin 334 with one of the recesses 333. The crank may then be placed on the squared extremity of the shaft 312 in order to effect a quick operation of the adjusting apparatus.

The positions of the negative 285 vertically in the negative holding frame are indicated by scales mounted on the side of the frame 280, as shown in Fig. 6. By effecting a relative adjustment of the upper and lower plate holding bars, as permitted by the clamping screws 294 engaging the rods 292, these bars may be caused to hold negative plates of various vertical dimensions and, in order that the negative plates may be approximately centered vertically with respect to the focal axis of the lens when first placed in the camera, means are provided for indicating the position of the lower plate holding bar 286 which will effect that approximate positioning of the negative plate. Accordingly, the end of the plate holding bar 286 is provided with a pointer 340 having an index mark thereon which may be brought into position opposite any of the graduation marks 341 which are formed on a scale 342. This scale is provided at its ends with elongated slots 343 adapted to be engaged by screws 344 by which this scale may be secured in accurate position on the side frame 280$^a$ of the negative holding frame. The graduations on this scale correspond to the vertical dimensions of various negative plates which may be used and when the index mark on the pointer 340 is positioned opposite one of these graduations, the negative plate resting on the bar 286 will be positioned approximately with its center in vertical alignment with the focal axis of the lens. After the upper plate holding bar 287 has been adjusted to engage the upper edge of the negative plate and the gripper fingers have been caused to engage the face of the plate, the clamping screws 294 may be tightened to secure the upper and lower plate holding bars in relative fixed position and these bars may then be adjusted in unison by the mechanism heretofore described in order to position the negative accurately with respect to the focal axis of the lens. This position is indicated by a pointer 345 which is adapted to be secured on one of the rods 292 by means of a set screw 346. This pointer 345 has an index mark which is adapted to travel adjacent to the graduations 347 which are marked on a scale 348, the graduations proceeding in both directions from an intermediate zero point. The scale 348 is provided at its ends with elongated slots 349 which are engaged by clamping screws 350 for accurately securing the scale on the side frame member 280$^a$ above the scale 342. These scales are adjustably mounted on the negative holding frame so that they may be adjusted vertically to compensate for any slight inaccuracies which may arise from the mounting or adjustment of the apparatus.

In addition to the means which are provided for effecting a vertical adjustment of the negative plate, provision is made for adjusting the negative holding frame bodily in a horizontal direction at right angles to the focal axis of the lens. This latter adjustment is effected by means of a horizontal adjusting bar 355 which is slidably mounted in bearings 356 carried by the auxiliary frame 206, as shown in Fig. 6. The bar 355 is spaced downwardly from the lower wall of the negative holding frame but is connected with the frame by a pair of upwardly extending lugs 357 on the bar which are adapted to receive between them a downwardly projecting lug 358 formed on the lower wall of the negative holding frame, these lugs being arranged to have a close fit so that there will be no lost motion when the bar 355 is adjusted transversely of the machine. This transverse adjustment is effected by an adjusting screw 360 illustrated particularly in Figs. 5 and 6. This adjusting screw is journaled in brackets 361 and 362 which are secured to the lower side of the bar 355 and the intermediate threaded portion of the screw has a threaded engagement with a block 363 secured by studs 364 on the end of the auxiliary frame 206 which is apertured to permit the adjusting screw to pass therethrough. The adjusting screw 360 is also threadedly engaged by a compensating nut 365 which is retained against rotation by pins 366 secured therein and extending into apertures 367 formed in the end wall of the frame 206, as shown in Fig. 5. Coil springs 368 are mounted on the pins 366 between the compensating nut 365 and the frame so that any lost motion between the threads of the screw and those of the block 363 is taken up by the compensating nut and a predetermined movement of the bar 355 is thereby secured by each rotation of the adjusting screw. To permit the operator to take up any lost motion or longitudinal play of the adjusting screw, one of the bearings 361 is provided with a set screw 369 which engages a plate 370 contacting with the end of the adjusting screw to form a thrust bearing therefor. The set screw 369 may be secured in adjusted position by the lock nut 371. The adjusting screw 360 has a squared extremity 360$^a$ adapted to be engaged by a crank and fractional turns of the screw may be measured by the position of the graduations 372 on a micrometer disk 373 with respect to an index mark 374$^a$ on the flange 374. The micrometer disk 373 is secured on the screw 360 by a set screw 373$^a$ to permit adjustment of the zero graduation to the index mark 374$^a$ and the flange 374 is secured to the bearing bracket 362 so that the index mark is fixed with respect to the adjusting bar 355.

The larger degrees of movement of the adjusting bar 355 and the relatively fixed negative carrying frame 50 are indicated by a pointer 375 which is fixed on the bar 355 and arranged to travel adjacent to a scale 376 mounted on the auxiliary frame 206, as shown in Figs. 6 and 9. To compensate for inaccuracies in the initial setting of the adjusting bar 355 and to permit the index mark on the pointer 375 to engage the zero point on the scale 376 at the same time that the index mark on the flange 374 registers with the zero mark on the disk 373, means are provided for adjusting the pointer 375 longitudinally on the adjusting bar 355. For this purpose, the pointer 375 is mounted on a plate 377, as shown in Fig. 38, and this plate is mounted to travel in a guide member 378 to the extent permitted by a screw 379 engaging a slot 380 in the plate. The plate 377 is attached to a screw 381 which has a bearing member 382 engaging a U-shaped slot in a flange 383 projecting outwardly from the guide member 378. The bearing member 382 has an annular flange 382$^a$ which overlaps one side of the flange 383 and on the other side of this flange the bearing member 382 is attached to a finger nut 384 to permit the adjustment of the plate 377 after releasing the clamping screw 379.

In addition to the adjustments heretofore described, the negative plate holder 50 is movable bodily to a position at one side of the remaining parts of the camera for the purpose of permitting access to the interior of the screen housing 51. To effect that bodily movement with ease and convenience, a carriage 390 is provided to travel on a track 391 within the dark room 55, as shown in Figs.

1, 33, 34, 35, 36 and 37. The carriage comprises a pair of grooved rollers 392 which travel on the upper edge of the track 391 and which have their axles connected to the depending hangers 393. These hangers have hooked extremities 394 adapted to engage pins 395 which are mounted between the yoked arms 396ª of the brackets 396 secured to the top walls of the housing frame 280. The hangers 393 are connected adjacent the lower part of the track 391 by a longitudinal frame member 397 and this frame member extends beyond the hangers and is turned downwardly to form a handle 398 which may be engaged by the operator in moving the carriage 390 longitudinally on the track. The bolts 399 which connect the frame member 397 with the hangers 393 are each provided with a grooved roller 400 adapted to engage the lower edge of the track 391.

Before moving the negative plate holding frame 50 away from the screen housing 51, it is desirable to elevate the frame 280 away from the auxiliary frame 206 and the track plate 391 is therefore mounted to permit the vertical movement thereof on its supports. The track 391 is carried indirectly by a longitudinal plate 401 which is provided near its ends with a pair of brackets 402 adapted to receive the lower ends of the supporting rods 403 to which the brackets are secured by set screws 404. The rods 403 extend downwardly from socket members 405 which are secured to the ceiling 55ª of the dark room and which are threadedly engaged by the rods 403 so that the track 391 may be adjusted to lie in a horizontal plane or to have any inclination desired. The rods 403 are secured in adjusted position within the socket members 405 by means of lock nuts 406. Adjacent their lower ends, the rods 403 are engaged by couplings 407 having other rods 408 extending horizontally inward therefrom with their ends secured to plates 409 which are attached to the vertical wall 54 of the dark room. The plate 401 is spaced downwardly from another longitudinal plate 410 which is provided with brackets 411 having a sliding engagement with the rods 403 beneath the coupling members 407. The ends of the plate 410 are spaced from the track plate 391 by means of filler blocks 412 which are placed between these plates, as shown in Fig. 35, the plates and filler blocks being secured together by studs 413. The plate 410 which is movable vertically on the rods 403 is provided inwardly of the filler blocks 412 with longitudinal slots 414 and the track plate 391 is similarly provided with longitudinal slots 415, these slots being arranged to register with each other in pairs for engagement by pins 416 having rollers 417 mounted thereon to engage the walls of the slots and having parts overlapping the plates so that the pins are retained in position. The pins 416 are moved longitudinally in the slots 414 and 415 by means of a bar 418 which is pivotally engaged by each of the pins 416. This bar extends longitudinally between the track plate 391 and the movable plate 410. The pins 416 are also pivotally engaged by links 419 which extend downwardly therefrom and are engaged at their lower ends by pins 420 which pass through the lower fixed plate 401 and through the parallel fixed plate 401ª which is spaced inwardly therefrom by the filler blocks 412ª, the plates and the filler blocks 412ª being held in position by the studs 413ª, as shown in Fig. 36. The links 49 engage the pins 420 between the plates 401 and 401ª so that the fixed bar 401ª lies beneath the movable actuating bar 418. At an intermediate point, the plate 410 and the track plate 391 are provided with other slots 414ª and 415ª, respectively, which receive another pin 416ª having rollers 417 mounted thereon to coact with the walls of the slots. The pin 416ª pivotally engages the middle part of the actuating bar 418 and also engages somewhat loosely the upper end of an actuating lever 421. This lever is mounted to swing on a pivot pin 422 which passes through the plates 401 and 401ª, as shown in Fig. 37. The lever extends downwardly and toward the right, as viewed in Fig. 33, and this depending portion of the lever is connected by a coil spring 424 with the stationary plate 401 so that the lever is normally retained in a position with the short arm thereof extending vertically. It will be apparent that when the lever 421 is rocked about its pivot 422, the movement of the pin 416ª in the slots 414ª and 415ª will necessarily cause a vertical movement of the plate 410 and the track plate 391. These members are guided in this vertical movement by the links 419 which are connected with the ends of the plates, thus retaining the track 391 in the desired position with respect to horizontal and vertical lines in all positions of its adjustment. When the track 391 has been elevated, as shown in Fig. 33, it elevates the frame 280 of the negative carrying frame so that the lug 358 on the lower part thereof is passed out of engagement with the lugs 357 on the adjusting bar 355. After the track 391 has thus been elevated, the operator may engage the handle 398 and move the carriage 390 on the track until the negative holding frame has been displaced from its normal position at the rear of the screen housing.

When the track 391 is in its lowermost position, the frame 280 of the negative carrying frame is normally too low to permit the engagement of the yoke pins 295 by the hook members 396ª mounted on the carriage 390 and means are therefore provided for tilting the rear end of the camera stand 60 upwardly preliminary to the movement of the negative carrying frame on the carriage 390. This tilting of the camera stand 60 is effected by the jack or toggle 430, shown in Fig. 32. This device comprises an angle shaped bar 431 having a substantially spherical lower extremity 432 which is mounted to oscillate in a thrust bearing 433 secured to the floor 55$^b$ of the dark room. The bar 431 is secured to a socket member 433 which extends upwardly and rearwardly and is detachably engaged by a handle 434. The bar 431 is connected by a pivot 435 with a link 436 which extends upwardly and is pivoted at 437 on a bracket 438 secured to the under side of the rear thrust frame 65 of the camera stand 60. A plate 439 is secured to the under side of the thrust frame 65 and extends downwardly on the forward side of the link 436 so that when the parts of the toggle device 430 are in the position shown in Fig. 32 the link 436 serves to elevate the camera stand and is retained in position by its engagement with the plate 439. When the rear end of the camera stand is thus elevated, the camera stand is relieved of its resilient support on the rear supporting frame 70, the toggle devices 430 being centrally located with respect to the rear truss frame, as shown in Fig. 6, so that the camera stand retains its balance when so tilted upwardly. The extent of the upward tilting movement of the camera stand is such as to bring the yoke pin 395 in alignment with the hooks 396$^a$ mounted on the traveling carriage 390 so that the carriage can then be moved on the track to engage the pins 395 and then, upon operating the lever 421 to elevate the track 391, the negative carrying frame will be moved upwardly out of engagement with the adjusting bar 355 and the screen housing 51. Thereupon, the carriage 390 may be moved longitudinally on the track to support the negative carrying frame to a position which will permit access to the interior of the screen housing and other parts of the camera. By reversing those operations the negative carrying frame may be restored to its position at the rear of the screen housing and then, upon moving the handle 434 toward the left, as viewed in Fig. 32, the rear end of the camera stand 60 will be permitted to lower until it is sustained entirely by its resilient supports.

Although it is thought that the operation of the camera will be sufficiently clear from the foregoing description, it may be advantageous to review the operation of certain parts in connection with a particular operation to be performed by the camera. Assuming that the camera is to be employed in making the several negatives of a color separation job, and that the subject is contained on an opaque sheet, this copy sheet is first tacked on the copy board 95 which will have been placed in position on the carrier 59. Having placed the copy on the board, the lens carrier 57 is then adjusted longitudinally of the track frame 198 until the lens is in approximate proper position for the desired reduction or enlargement of the subject. This adjustment of the lens carrier is effected by turning the handle 221 shown in Fig. 16 to release the detent 215 from the toothed wheel 214, thereby permitting the operation of the crank 213 which rotates the worm wheel 210 on the screw shaft 203 which then operates as a rack bar. When the approximate position is reached, the detent block 216 is again lowered to cause the detent 215 to engage the toothed wheel 214 to hold the lens carrier in fixed position except for a finer adjustment which may be made by the rotation of the screw shaft 203. Having adjusted the lens carrier to the approximate desired position, the copy board carrier 59 is then moved to the approximate desired position by placing a crank on the adjusting shaft 149, shown in Fig. 9, and rotating this shaft until the desired graduation on the tape 137 appears opposite the index mark 143 on the wall of the housing 142, shown in Fig. 2. This approximate position of the copy carrier 59 is determined by putting a ground glass plate in the plate holder 50 of the camera and measuring the size of the image produced thereon by projection through the lens from the subject on the copy board. The ground glass plate has a layout in pencil of the size of the image and is placed in the center of the negative plate carrier, against the stop 288 shown in Fig. 6, by the method described in my prior Patent No. 1,521,633 dated January 6, 1925. In this way the ground glass plate is centered horizontally in the plate holder and the vertical positioning thereof may be effected by operating a crank on the squared extremity 312$^a$ of the shaft 312, shown in Fig. 6, and by effecting the fine adjustment through the operation of a crank on the squared extremity of the shaft 327 shown in Figs. 3 and 4.

The next operation is to focus the image sharply to the proper size by moving the lens slides 59 through the operation of the screw shaft 203 having the hand wheel 209 on the end thereof, as shown in Fig. 9. The precise position of the lens carrier is indicated by reference to the micrometer graduations 207 which move in proximity to the index mark on the bearing member 205. The larger degrees of movement of the carriage are recorded on the scale 206 shown in Figs. 1 and 15. In connection with this focusing operation it may also be necessary to effect a fine adjustment of the copy board carrier 59 through the operation of the hand wheel 164, shown in Fig. 22, whereby the rack bar 152 is adjusted longitudinally through a limited range of movement, the extent of movement being noted by the position of the graduations on the plate 167 with respect to the index mark 168 and by the position of the graduations 165$^a$ of the micrometer disk with respect to the stationary index mark 166. It will be understood that before operating the hand wheel 164, the crank 169 is operated to turn the shaft 158 and thereby actuate the detent block 154 through the rotation of the cam 157 so that the rack bar 152 will be connected to the truck 115 of the copy board carrier. These adjustments are continued until the image is sharply defined and of the proper size.

The operator will then take a reading of the rough poistion of the lens carrier 57 as revealed by the position of the pointer 201ᵃ on the scale 202 and of the fractional position of the lens carrier as shown by the reading of the micrometer 207 shown in Fig. 9. The operator also takes a reading of the approximate position of the copy board carrier 59 as shown by the graduation on the tape 137 which is positioned opposite the index mark 143, together with a reading of the fractional position of the copy board carrier as indicated by the scale 167 and micrometer graduation 165ᵃ shown in Fig. 22. These readings are recorded so that if it is necessary to repeat the operation of making a plate, another negative plate can be made to register with those previously completed.

The operator then turns on the light so that a light will be reflected from the subject carried by the copy board into the lens of the camera and upon removing the lens cap, an exposure is made on the negative plate which will have been positioned in the negative plate carrier in the manner previously described, according to which the negative plate 285 is placed between the plate holding bars 286 and 287, shown in Fig. 7, with the lower bar 286 adjusted to such a position that the position of the pointer 340 on the scale 342 will locate the particular size of negative vertically so that its central part will coincide with the focal axis of the camera. The negative plate is positioned laterally by placing it against the stop 288. This operation of focusing the camera and making exposures may be continued for as many color separations as the particular job demands.

Having made the exposures, the negatives are placed successively in the holding bars 100 of the subject plate holder 59, as shown in Fig. 20, after removing the copy board 95, and after adjusting the plate vertically in the subject plate carrier by the operation of the shaft 108 until it is in the desired position, the negatives are exposed in turn in order to make a set of continuous tone positives, either of the same size as the negatives or enlarged. In case the continuous tone positives are enlarged, it is necessary to take similar readings to those which were previously taken after the lens carrier 57 and the subject plate carrier 59 have been located to secure the desired focus and enlargement. After these positives have been color corrected by the lithographic artist, they are again mounted in turn on the bars of the subject plate carrier 59 and the screen 233, which was previously out of the camera, is placed in position on the screen holder 235 shown in Fig. 10. The separation of the screen holding bars may be adjusted by operating a crank on the squared extremity 256ᵃ of the shaft 256 and the screen may be adjusted angularly by releasing the clamps 236 and turning the screen until the desired graduations on the marginal rim thereof are positioned correctly opposite the index marks or pointers 237ᵃ. The screen should also be adjusted longitudinally of the focal axis of the lens by operating the handle 273 until the proper screen distance from the ground glass plate in the negative plate carrier 50 is ascertained through inspection with a magnifying glass, after which the screw stop 276, shown in Fig. 27, is adjusted to hold the lever 273 in the proper position. The ground glass plate is placed in the plate holder bars of the holder 50 and having placed the light back of the reflecting hood 113, shown in Fig. 1, the image carried by the negative plate in the plate carrier 59 is projected through the lens and recorded on the ground glass plate in the negative plate carrier. In this way a series of continuous tone positives are made.

The next operation is to expose the positive plate for making the final screen negative plate, one for each color to be reproduced. In this operation the readings are taken of the position of the lens carrier 57 and the subject carrier 59, as before, and these are recorded for future reference in case it is necessary to make new screen negatives for any of the colors or in case it is desired to make a number of similar negatives for one job. In some cases the operator may shift to another job before completing the one first worked on, in which case it is necessary to have the readings to position the parts again in the same adjusted positions that they were in when the first portion of the work was done.

In case the operator desires to use the camera for making multiple negatives, the layout on the ground glass plate is made as before and the image is positioned to the layout by adjusting the plate holding bars of the negative carrier vertically and by shifting the negative carrying frame horizontally. The operator then secures the pointer 345 in a position opposite the zero graduation on the scale 348. The negative plate holder frame 280 is adjusted horizontally by turning the screw shaft 316 until the pointer 375 is at the zero graduation on the scale 376, as shown particularly in Fig. 38, and until the zero micrometer graduation 372 is opposite the index mark on the flange 374. Then the plate holder is shifted vertically to the first vertical position shown by the layout sheet, the vertical adjustment being accomplished by turning the shaft 312 by a crank placed on the end thereof and also by the fine adjustment permitted by the turning of the shaft 327 shown in Fig. 4 and the plate holding frame 280 is shifted to the left by operating the screw 360 to the first reading position, as shown by the layout sheet. When the negative is thus positioned horizontally and vertically by the shifting of the plate holding frame 280, the first exposure is made, after which the plate holder is adjusted vertically or horizontally, or both, to the next position for another exposure and this procedure is followed until exposures have been made for all positions on the negative plate which are shown by the layout sheet. The camera may of course be employed in other ways and other adjustments made to adapt the device to the particular work being done.

Figs. 40 to 49, inclusive, of the drawings illustrate certain parts of a modified form of construction, it being understood that the features of the camera which are not illustrated in these figures of the drawings may be constructed as shown in the embodiment of the invention heretofore described. This modified construction comprises a camera stand 460 having upper tubular longitudinal frame members 461 and lower tubular longitudinal frame members 462 united by the transverse truss frames 463. This camera stand is adapted to support the relatively adjustable parts of the camera, including the subject plate holder designated generally by the number 465. This subject plate carrier comprises a horizontal truck frame 466 of substantially rectangular form provided at one side with a bearing shaft 467 in which are journaled the axles of the flanged rollers 468 which travel on one of the upper track members 461, as shown in Fig. 40. At the other side of the truck platform 466, there are provided other bearings 469 in which are journaled the axles of a cylindrical roller 470 adapted to travel on the upper surface of the other tubular track member 461. The sides of the truck platform 466 are provided with outwardly extending flanges 471 to which are bolted the upwardly supporting standards 472 which are united at their upper ends by the transverse frame member 473 illustrated particularly in Fig. 40. The supporting structure made up of the standards 472 and the frame members 473 extends vertically from the truck platform 466 and has located on the vertical side thereof a rectangular plate carrying frame 474 comprising vertical side frame members 474$^a$ and upper horizontal frame members 474$^b$ and the lower horizontal frame member 474$^c$, all of which are of angle cross-section. The frame 474 serves as a support for an upper plate holding bar 475 and a lower plate holding bar 476 which are provided along their opposing edges, as shown in Fig. 44, with channel bars 477 adapted to engage the edges of the subject plate 478 which is secured in position in these channel bars by means of the set screws 477$^a$. The channels 477 may also engage the under-cut supporting bars 479$^a$ of a copy board 479 shown by dotted lines in Fig. 44. The lower plate holding bar 476 is provided at its ends with brackets 480 which are threadedly engaged by the adjusting screws 481 journaled at their ends in bearings 482 which are carried by the side frame members 474$^a$ of the plate carrying frame. These brackets 480 have secured therein the vertically extending rods 483 which are slidably engaged by brackets 484 secured on the upper plate holding bars 475, clamping screws 485 being provided for securing the upper plate holding bar in adjusted position on the rods 483 so that the upper and lower plate holding bars may be adjusted in unison by the rotation of the screws 481. The upper plate holding bar 475 has connected thereto at each end a chain 486 which passes upwardly through the top frame member 474$^b$ and thence around a pulley 487 mounted on a pivot 488 carried by the top frame member. The downwardly extending other extremities of these chains are attached to counter-weights 489. The lower ends of the set screws 481 are connected by beveled gears 489 with a horizontal adjusting shaft 490 which is journaled in bearings at the ends of the lower side frame member 474$^c$ and which extends through the side frame member at one side of the machine so that the squared extremity of the shaft may be engaged by a crank for the purpose of rotating it and thereby raising or lowering the subject plate 478.

As in the construction of the negative plate holder heretofore described, the shaft 490 has a worm wheel 491 secured on the end thereof for engagement by a worm 492 which is adjustable vertically by the rotation of a handle 493 connected to an eccentric sleeve having the construction heretofore described, so that when desired, a relatively slow and accurate adjustment of the screw shafts 481 may be effected by applying a crank to the squared extremity 494 of the shaft upon which the worm 492 is mounted. The lower subject plate holding bar 476 is provided at one end with a pointer 495 which is adapted to travel over a scale 496 secured to one of the side frame members 474$^a$. By referring to the position of the pointer on this scale, the subject scale 478 can be located preliminarily so that its center will be substantially coincident with the focal axis of the lens.

The copy board and plate carrying frame 474 is retained along its upper edge against tilting rearwardly from the frame members 473 by means of flanges 497 which are formed on the upper frame member 474$^b$ and which extend upwardly within the downwardly extending plates 498 which are attached to brackets 499 mounted on the upper frame member 473 of the supporting frame. The lower frame members 474c of the plate carrying frame are provided with two downwardly extending flanges 500 which are adapted to travel on rollers 501 mounted to rotate on bearing members 502 which are carried by the bar 503. Spring plates 504 are secured to the heads of the bearing members 502 by screws 505 and they extend upwardly to contact with the sides of the flanges 500, as shown in Fig. 43, thereby retaining the flanges in position on the rollers and against the supporting bar 503. This supporting bar is mounted between a plurality of pairs of lugs 506 which are formed on the base of the truck member 466. The supporting bar 503 is pivotally mounted at 507 on two of these lugs 506 located at one end of the bar so that the bar may be tilted upwardly at the opposite end to carry with it the subject carrying frame 474 for the purpose of regulating the position of that frame with respect to a horizontal line. For this purpose, the portion of the bar 503 opposite the pivots 507 is engaged by a notch in the upper end of a plunger 508 having the form shown particularly in Fig. 42 where it is illustrated as having a threaded engagement with a sleeve 509 journaled in a bearing 510 carried by the truck platform 466. This sleeve 509 has keyed thereon a spiral gear 511 which meshes with a spiral gear 512 fixed on a longitudinal shaft 513. This shaft is operated from the rear end of the machine in the same manner as the corresponding shaft of the previously described form of the invention so that when the shaft is rotated in its bearings or carried by the camera stand 460, the plunger 508 will be elevated to raise the bar 503 and thereby adjust the inclination of the plate carrying frame 474.

For the purpose of adjusting the plate carrying frame 474 in a direction transversely of the focal axis of the camera, this frame is moved on the rollers 501 by the operation of an adjusting screw 514 which is pivotally connected to one end of the adjusting bar 503, as shown in Fig. 40, and which is provided with a rotatable nut 515 having an annular groove 516 therein which is engaged by the walls of a notch 517 formed in an angle plate 518 fixed on the lower frame member 474c of the plate carrying frame, as indicated particularly in Figs. 45 and 46. The nut 515 has a narrow handle portion 515a, and is provided with a recess in which is mounted a coil spring 519 adapted to bear against a compensating plate 520 which threadedly engages the adjusting screw 514 and which is secured within the enlarged outer recess of the nut 515 by means of screws 521. The screws 521 are preferably left somewhat loose and the spring 519 is adapted to force the compensating plate 520 against the threads of the adjusting screw in order to take up any play in the engagement of the adjusting screw with the threads of the nut 515. In this way, a uniform adjustment of the plate carrying frame 474 on the rollers of the bar 503 is secured for each rotation of the nut 515 on the stationary screw 514.

The plate carrier illustrated in Figs. 41, 44 and 45 is adjustable longitudinally of the camera stand by mechanism which is the same in construction as that previously described, including a rack bar 525 which is adapted to be connected to the truck platform or base 466 for effecting a fine adjustment of the plate carrier longitudinally of the machine by the operation of a screw and including also a rotatable shaft 526 which controls the connection of the rack bar 525 with the truck of the carrier. The coarse adjustment of the carriage is effected by the mechanism heretofore described connected to a chain 527 which extends longitudinally of the machine alongside of an endless tape 528 by which the position of the carrier is indicated.

The modified construction of the camera comprises also modified means for supporting the longitudinal rotatable shafts 513 and 526 between their ends while permitting the carrier truck to pass longitudinally on the camera stand. For this purpose, a pair of transverse bearing shafts 530 are provided, these shafts being journaled in bearings 531 secured to the intermediate truss frame 460. Each shaft has secured thereon a pair of supporting arms 532, each of which carries at its upper end a semi-circular bearing 532a adapted to engage one of the shafts 513 or 526, as shown in Figs. 40 and 41. Each shaft 530 also has secured thereon a crank arm 533 and these crank arms are pivotally connected at their upper ends to a link 534 which extends longitudinally of the machine parallel to the path of travel of the plate carrier 465. The ends of the link 534 are turned downwardly, as shown in Fig. 41, so that the intermediate part of the link is normally elevated above the upper ends of the cranks arms 533. The link 534 is provided adjacent each end of the straight portion thereof with a laterally projecting pin 535, each pin being adapted to be engaged by one of the trip fingers 536 which are secured to each of the front and rear edges of the truck platform 466. When one of the shafts 530 is turned to cause the bearings 532a mounted thereon to support the shafts 513 and 526, as shown in Fig. 41, the plate carirer 465 is permitted to pass longitudinally of the shafts to a position between the intermediate bearing members 532a because the other set of bearing members is then depresesd due to the angular positions of the crank arms 533 on the other shaft 530. Upon continued movement of the carriage 465 in the direction indicated by the arrow 537, in Fig. 41, the depending trip finger 536 at the leading edge of the truck frame 466 engages the pin 535 and rocks the shafts 530 through the connecting link 534, thereby depressing the bearing members 532ᵃ in advance of the carriage and elevating the other bearing members into engagement with the shafts 513 and 526 at the rear of the carriage.

In Figs. 47, 48 and 49 of the drawings there is illustrated a modified construction of the lens carrier 540. This lens carrier comprises a platform 541 on which are mounted the upwardly extending standards 542 carrying the lens board 543 to which the bellows 544 is attached. Instead of employing an auxiliary track frame for permitting longitudinal movement of the lens carrier, as in the construction previously described, the embodiment illustrated in Fig. 47 is arranged to slide on the track rails 461 of the camera stand, one side of the platform 541 being provided with downwardly extending bearing arms 545 having V-shaped recesses 546 therein to fit over and contact with one of the rails 461 to guide the platform in its travel and retain it against lateral displacement, while the other side of the platform 541 is provided with a single downwardly extending arm 547 having a flat lower extremity adapted to ride on the upper surface of the other track rail 461.

The lens carrier 540 is moved longitudinally of the camera stand 460 by mechanism which is similar to that employed in the embodiment of the invention previously described for moving the copy board holder longitudinally of the machine. For this purpose, a chain 548 has its ends connected to the downwardly extending flanges 541ᵃ of the platform 541 and at the ends of the machine the chain is extended around sprocket wheels 549 mounted on shafts 550 which are carried by bearing brackets 551. This chain is operated in the manner previously described and an endless tape 552 is mounted alongside the chain for the purpose of indicating the position of the lens carrier longitudinally of the machine. The fine adjustment of the lens carrier 540 is effected by means of mechanism of the form previously described connected to a rack bar 555 which is mounted to slide in bearings 556 carried by the frame members 463 and which also engages a depending bracket 557 carried by the under side of the lens carrier platform 541. A detent block 558 is pivoted at 559 on this bracket 557 and is provided with teeth 560 adapted to move into mesh with the teeth of the rack bar 555 through the operation of a cam 561 which moves with the bracket 557 and which is splined on a shaft 562. This shaft is rotated by a handle 563 at the end of the machine and when rotated about its longitudinal axis, the shaft causes the detent block to move inwardly against the compression of a coil spring 564 mounted on a pin 565, as shown in Fig. 49, thereby establishing a driving connection between the rack bar and the lens carrier so that the longitudinal movement of the rack bar will then effect adjustment of the lens longitudinally of its focal axis.

Although certain embodiments of the invention have been shown and described, it will be understood that the invention may be constructed in various forms and operated in a variety of ways within the scope of the appended claims.

I claim:

1. The combination in a camera, of a camera stand, photographic apparatus comprising parts relatively adjustable on said stand, resilient supporting means on which said stand is suspended, and ball bearing means for connecting said stand with said resilient supporting means and permitting relative universal movements thereof.

2. The combination in a camera, of a camera stand, photographic apparatus comprising parts which are relatively adjustable on said stand, resilient supporting means on which said stand is suspended, trunnions carried by said stand, and ball bearings mounted on said trunnions and carried by said resilient supporting means for permitting free turning movements of said trunnions with respect to said supporting means.

3. The combination in a camera, of a camera stand, photographic apparatus mounted on said stand, resilient supporting means for said stand, ball bearings carried by said resilient supporting means including a plurality of balls confined by inner and outer raceways, said outer raceways being of sufficient diameter to permit free turning movements in all angular directions of said inner raceways, and trunnions carried by said stand and engaging said inner raceways.

4. The combination in a camera, of a camera stand, a fixed supporting frame, a bearing member resiliently suspended from said supporting frame, a trunnion attached to said camera stand and engaging said bearing, and photographic apparatus mounted on said camera stand.

5. The combination in a camera, of a camera stand, photographic apparatus mounted on said stand, a supporting frame having an upper transverse frame member, a supporting rod suspended from said transverse frame member and having angular movement with respect to said frame, a bearing member resiliently suspended on said rod, and means attached to said camera stand and engaging said bearing member.

6. The combination in a camera, of a camera stand, photographic apparatus mounted on said stand, a supporting frame having an upper transverse frame member, a supporting rod suspended from said transverse frame member and having angular movement with respect to said frame, a spring retaining member mounted on said rod, springs mounted on said retaining member and extending upwardly therefrom, another spring retaining member mounted on the upper ends of said springs, a bearing member suspended from said last mentioned spring retaining member, and a trunnion attached to said camera stand and engaging said bearing member.

7. The combination in a camera, of a camera stand, photographic apparatus mounted on said stand, a supporting frame having an upper transverse frame member, a supporting rod suspended from said transverse frame member and having angular movement with respect to said frame, a spring retaining member mounted on said rod, springs mounted on said retaining member and extending upwardly therefrom, another spring retaining member mounted on the upper ends of said springs, a bearing member suspended from said last mentioned spring retaining member, a ball bearing mounted in said bearing member, and a trunnion attached to said camera stand and engaging said ball bearing.

8. The combination in a camera, of a camera stand comprising longitudinal frame members connected by transverse frame members, photographic apparatus mounted on said camera stand, a pair of axles extending transversely of said camera stand, a plurality of supporting frames each having side frame members extending on opposite sides of the end of one of said axles, ball bearings engaging the ends of said axles, and resilient means for suspending said ball bearings from said supporting frames.

9. The combination in a camera, of a camera stand, a copy carrier mounted for movement on said stand longitudinally of the focal axis of the camera, graduated means for effecting a relatively rapid and coarse adjustment of said copy carrier in said direction, a bar extending longitudinally of said axis and having connection with said copy carrier, and graduated means for effecting a fine adjustment of said bar longitudinally of said axis and thereby effecting a corresponding adjustment of said copy carrier.

10. The combination in a camera, of a camera stand, a copy carrier mounted for movement of said stand longitudinally of the focal axis of the camera, a slidably mounted toothed bar extending longitudinally of said camera stand, means having connection with said copy carrier for forming a detachable connection thereof with said teeth of said bar, and graduated means for adjusting said bar longitudinally of said focal axis.

11. The combination in a camera, of a camera stand, a copy carrier movable on said stand longitudinally of the focal axis of the camera, an endless chain having a connection with said copy carrier, sprocket gears for supporting and driving said chain, means for operating said sprocket gears to drive said chain, an endless tape attached to said copy carrier and movable with said chain, and means associated with said endless tape for indicating the position of said copy carrier.

12. The combination in a camera, of a camera stand, a copy carrier mounted on said stand for movement longitudinally of the focal axis of the camera, graduated means for effecting a relatively rapid movement of said copy carrier in said direction, a bar mounted on said stand for movement parallel to said axis, means for detachably connecting said bar with said copy carrier, and graduated means for moving said bar to effect a fine adjustment of said copy carrier in said direction.

13. The combination in a camera, of a camera stand, a copy carrier mounted on said stand for movement longitudinally of the focal axis of the camera, means controlled from one end of said stand for effecting a relatively rapid movement of said copy carrier in said direction, a bar slidably mounted on said stand, means controlled at said end of said stand for effecting a fine adjustment of said bar longitudinally of said axis, means for detachably connecting said bar with said copy carrier, and means connected with said copy carrier and extending to said end of said stand for controlling the operation of said connecting means.

14. The combination in a camera, of a camera stand, a copy carrier movable on said stand, a rack bar slidably mounted on said stand, a detent mounted on said copy carrier for engagement with said rack bar, a cam for controlling the operation of said detent, and a shaft for operating said cam.

15. The combination in a camera, of a camera stand, a carrier frame mounted on said stand for movement longitudinally of the focal axis of the camera, a rack bar slidably mounted on said stand for longitudinal movement parallel to said axis, a rotatable shaft extending parallel to said rack bar, and means movable on said shaft and operative in various positions of said carrier frame for detachably connecting said carrier frame with said rack bar.

16. The combination in a camera, of a camera stand, a carrier frame movable on said stand longitudinally of the focal axis of the camera, a rack bar slidably mounted on said stand for movement parallel with said axis, a bracket carried by said frame, a shaft extending parallel to said rack bar and having a bearing in said bracket, a cam splined on said shaft and movable with said bracket, and a detent mounted on said bracket and actuated by said cam for engaging the teeth of said rack bar.

17. The combination in a camera, of a camera stand, a carrier frame mounted on said stand, means for effecting a relatively rapid movement of said carrier frame on said stand parallel to the focal axis of the camera, a bar slidably mounted on said stand parallel to said axis, micrometer screw mechanism connected to one end of said bar for effecting gradual predetermined movements thereof, and means controlled from a position adjacent said micrometer screw mechanism for detachably connecting said bar to said carrier frame in various positions of said carrier frame.

18. The combination in a camera, of a camera stand, a carrier frame mounted on said stand for movement longitudinally of the focal axis of the camera, actuating means for moving said carrier frame, means movable with said carrier frame for detachably connecting said frame with said actuating means in various positions of said carrier frame, a shaft extending parallel to said axis and having a continuous engagement with said connecting means in all positions of said carrier frame, a pair of movable bearing members for supporting an intermediate part of said shaft, and means actuated by the movement of said carrier frame for moving one of said bearings out of engagement with said shaft in advance of said carrier frame and for simultaneously moving the other of said bearing members into engagement with said shaft behind said carrier frame.

19. The combination in a camera, of a camera stand, a carrier frame movable on said stand, actuating mechanism for effecting said movement, a shaft extending longitudinally of said camera stand for controlling the operation of said mechanism, a bracket carried by said frame having said shaft journaled therein, a pair of bearing members, and means actuated by the movement of said carrier frame for moving one of said bearing members out of engagement with said shaft and simultaneously moving the other of said bearing members into engagement with said shaft.

20. The combination in a camera, of a camera stand, a carrier frame movable on said stand, actuating mechanism for effecting said movement, a shaft extending longitudinally of said camera stand for controlling the operation of said mechanism, a bracket carried by said frame and having said shaft journaled therein, a pair of bearing members mounted on said camera stand and connected with each other for alternate engagement with said shaft, and means actuated by said carrier frame when said bracket is between the vertical planes of said bearing members for disengaging one of said bearing members in advance of said bracket and bringing the other of said bearing members into engagement with said shaft behind said bracket.

21. The combination in a camera, of a camera stand, a carrier frame movable on said stand, actuating mechanism for effecting said movement, a shaft extending longitudinally of said camera stand for controlling the operation of said mechanism, said carrier frame having a part maintaining a continuous connection with said shaft during its movement on said stand, bearing means for the end portions of said shaft, and means for maintaining a bearing support for an intermediate part of said shaft while permitting said part of said carrying frame to pass along said shaft past said bearing support during the adjustment of said carrying frame.

22. The combination in a camera, of a camera stand, a truck movable on said stand, a plate carrying frame having a pivotal connection with said truck at one side of said truck for movement transversely of the direction of travel of said truck, a plunger movable vertically on said truck for engaging said frame and effecting said tilting movement of said frame, mechanism movable with said truck for effecting the operation of said plunger, and a shaft extending longitudinally of said camera stand for operating said mechanism.

23. The combination in a camera, of a camera stand, a truck movable on said stand, a plate carrying frame having a pivotal connection with said truck at one side of said truck for movement transversely of the direction of travel of said truck, a plunger movable vertically on said truck at the side thereof opposite said pivotal connection for effecting said tilting movement of said frame, mechanism movable with said truck for effecting the operation of said plunger, a shaft extending longitudinally of said camera stand for operating said mechanism, and graduated means located at the end of said stand for indicating the position of said frame in response to the operation of said mechanism.

24. The combination in a camera, of a camera stand comprising a pair of longitudinal parallel rails, a carrier frame having a truck provided with a pair of wheels adapted to travel on one of said rails and with a third wheel adapted to travel on the other of said rails on a line midway between said first mentioned wheels to provide a three-joint support, and adjusting mechanism for effecting the movement of said carrier on said camera stand.

25. The combination in a camera, of a camera stand comprising a pair of parallel rails, a carrier frame, a pair of grooved wheels mounted on said frame and adapted to travel on one of said rails, a single roller mounted at the other side of said frame and having a cylindrical surface adapted to travel on the other of said rails, and adjusting mechanism for effecting movement of said carrier frame longitudinally of said rails.

26. The combination in a camera, of a camera stand, a truck mounted for travel on said camera stand, a supporting bar pivoted on said truck for movement transversely to the travel of said truck about its pivotal axis, means operative in all positions of said truck for tilting said bar, and a carrying frame mounted on said bar.

27. The combination in a camera, of a camera stand, a truck mounted for travel on said camera stand, a supporting bar pivoted on said truck for movement transversely to the travel of said truck about its pivotal axis, means operative in all positions of said truck for tilting said bar, a carrying frame mounted on said bar, and means for adjusting said carrying frame longitudinally of said bar.

28. The combination in a camera, of a camera stand, a truck mounted for travel on said camera stand, a supporting bar pivoted on said truck for movement transversely to the travel of said truck about its pivotal axis, means operative in all positions of said truck for tilting said bar, a carrying frame mounted on said bar, rollers mounted on said bar, said carrying frame having parts adapted to rest on said rollers, and adjusting mechanism for moving said carrying frame longitudinally of said bar.

29. The combination in a camera, of a camera stand, a truck mounted for travel on said camera stand, a supporting bar pivoted on said truck for movement transversely to the travel of said truck about its pivotal axis, means operative in all positions of said truck for tilting said bar, a carrying frame mounted on said bar, rollers mounted on said bar, said carrying frame having parts adapted to rest on said rollers, adjusting mechanism for moving said carrying frame longitudinally of said bar, and graduated means for indicating the position of said carrying frame on said bar.

30. The combination in a camera, of a camera stand, a supporting base mounted for travel on said stand longitudinally of the focal axis of the camera, a supporting bar pivoted on said base for tilting movement transversely to said focal axis, adjusting mechanism mounted on said base for effecting said tilting movement, means for operating said adjusting mechanism in all positions of said base on said stand, rollers mounted on said supporting bar, a subject carrying frame, flanges carried by said frame and resting on said rollers, retaining plates for maintaining said flanges on said rollers, means including an adjusting screw for moving said carrying frame longitudinally of said bar on said rollers, and graduated means for indicating the adjustment of said carrying frame on said bar.

31. The combination in a camera, of a camera stand, photographic apparatus mounted on said camera stand, a plurality of fixed supports, resilient means suspended from said fixed supports, and connections for suspending said camera stand on said resilient means, said connections comprising universal bearings adapted to permit free movement in all directions of said camera stand with respect to said supports.

In testimony whereof, I have subscribed my name.

ALEXANDER T. KOPPE.